(12) United States Patent
Chen

(10) Patent No.: US 12,429,998 B2
(45) Date of Patent: Sep. 30, 2025

(54) IMAGE DISPLAY METHOD AND APPARATUS, AND ELECTRONIC DEVICE

(71) Applicant: VIVO MOBILE COMMUNICATION CO., LTD., Dongguan (CN)

(72) Inventor: Zhe Chen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/212,173

(22) Filed: Jun. 20, 2023

(65) Prior Publication Data

US 2023/0333704 A1 Oct. 19, 2023

Related U.S. Application Data

(63) Continuation of application No. PCT/CN2021/138690, filed on Dec. 16, 2021.

(30) Foreign Application Priority Data

Dec. 21, 2020 (CN) .......................... 202011519313.X

(51) Int. Cl.
G06F 3/048 (2013.01)
G06F 3/04815 (2022.01)
(Continued)

(52) U.S. Cl.
CPC ...... G06F 3/04815 (2013.01); G06F 3/04845 (2013.01); H04N 23/632 (2023.01); H04N 23/698 (2023.01); G06F 2203/04802 (2013.01)

(58) Field of Classification Search
CPC .......................... H04N 23/698; H04N 23/632; G06F 3/04845; G06F 2203/04802
See application file for complete search history.

(56) References Cited

U.S. PATENT DOCUMENTS 5,521,841 A * 5/1996 Arman .................... H04N 5/147
                                                       345/589
5,760,767 A * 6/1998 Shore .................... G11B 27/034
(Continued)

FOREIGN PATENT DOCUMENTS

CN       105227829 A     1/2016
CN       108153900 A     6/2018
(Continued)

OTHER PUBLICATIONS

International Search Report issued in corresponding International Application No. PCT/CN2021/138690, mailed Mar. 3, 2022, 4 pages.
(Continued)

Primary Examiner — Nicholas Augustine
(74) Attorney, Agent, or Firm — IPX PLLC

(57) ABSTRACT

An image display method and apparatus, and an electronic device are provided. The method includes: displaying, by an electronic device, a first input performed by a user in a case that a first three-dimensional model control is displayed on a photographing preview interface, where the first three-dimensional model control includes N display surfaces, and N is a positive integer; and displaying, by the electronic device on a first display surface in the N display surfaces in response to the first input, a first image photographed by a camera, where each display surface in the N display surfaces is used to display one image, and different display surfaces are used to display different images.

16 Claims, 21 Drawing Sheets

(51) Int. Cl.
*G06F 3/04845* (2022.01)
*H04N 23/63* (2023.01)
*H04N 23/698* (2023.01)

(56) References Cited

U.S. PATENT DOCUMENTS

| | | | | |
|---|---|---|---|---|
| 5,852,435 | A * | 12/1998 | Vigneaux | G06F 16/40 |
| | | | | 345/428 |
| 6,069,606 | A * | 5/2000 | Sciammarella | G09G 5/14 |
| | | | | 345/660 |
| 6,332,147 | B1 * | 12/2001 | Moran | G06F 16/489 |
| | | | | 715/231 |
| 6,463,444 | B1 * | 10/2002 | Jain | G06F 16/78 |
| RE38,401 | E * | 1/2004 | Goldberg | G06F 16/54 |
| | | | | 715/802 |
| 6,774,914 | B1 * | 8/2004 | Benayoun | G06F 3/04815 |
| | | | | 345/650 |
| RE38,609 | E * | 10/2004 | Chen | H04L 67/75 |
| | | | | 715/721 |
| 6,807,361 | B1 * | 10/2004 | Girgensohn | G11B 27/34 |
| | | | | 386/282 |
| 7,143,362 | B2 * | 11/2006 | Dieberger | G06F 16/338 |
| | | | | 715/764 |
| 7,149,974 | B2 * | 12/2006 | Girgensohn | G11B 27/34 |
| | | | | 715/788 |
| 7,194,527 | B2 * | 3/2007 | Drucker | G06F 16/954 |
| | | | | 707/E17.009 |
| 7,246,322 | B2 * | 7/2007 | Neely | G06F 16/78 |
| | | | | 715/747 |
| 7,437,005 | B2 * | 10/2008 | Drucker | G06F 3/0485 |
| | | | | 707/E17.026 |
| 7,559,039 | B2 * | 7/2009 | Ridgley | G06F 16/904 |
| | | | | 715/854 |
| 7,665,033 | B2 * | 2/2010 | Byrne | G06F 3/0481 |
| | | | | 715/782 |
| 7,689,525 | B2 * | 3/2010 | Drucker | G06F 16/48 |
| | | | | 715/764 |
| 7,769,832 | B2 * | 8/2010 | Drucker | G06F 16/44 |
| | | | | 709/220 |
| 7,877,707 | B2 * | 1/2011 | Westerman | G06F 3/04883 |
| | | | | 715/863 |
| 7,884,855 | B2 * | 2/2011 | Ortiz | H04N 21/4263 |
| | | | | 348/157 |
| 7,956,848 | B2 * | 6/2011 | Chaudhri | G11B 27/105 |
| | | | | 345/173 |
| 8,340,654 | B2 * | 12/2012 | Bratton | H04N 7/185 |
| | | | | 455/550.1 |
| 8,665,375 | B2 * | 3/2014 | Moore | G06T 7/246 |
| | | | | 345/157 |
| 8,830,193 | B2 * | 9/2014 | Shah | G06F 3/0488 |
| | | | | 345/173 |
| 9,762,757 | B2 * | 9/2017 | Kim | H04N 1/0035 |
| 10,007,393 | B2 * | 6/2018 | King | G06F 3/0482 |
| 11,170,085 | B2 * | 11/2021 | Devine | G06V 40/67 |
| 11,922,563 | B2 * | 3/2024 | McEroy Flavelle | G11B 27/11 |
| 2001/0010546 | A1 | 8/2001 | Chen | |
| 2003/0030595 | A1 * | 2/2003 | Radley-Smith | G06F 1/163 |
| | | | | 345/1.3 |
| 2003/0184598 | A1 * | 10/2003 | Graham | G11B 27/034 |
| | | | | 707/E17.058 |
| 2003/0189588 | A1 * | 10/2003 | Girgensohn | G06F 16/739 |
| 2004/0076444 | A1 * | 4/2004 | Badovinac | G06F 1/1626 |
| | | | | 399/81 |
| 2005/0034084 | A1 | 2/2005 | Ohtsuki et al. | |
| 2005/0039140 | A1 * | 2/2005 | Chen | G06F 3/0482 |
| | | | | 715/836 |
| 2005/0097135 | A1 * | 5/2005 | Epperson | H04N 21/47217 |
| 2005/0120053 | A1 * | 6/2005 | Watson | G06Q 30/06 |
| 2005/0138564 | A1 * | 6/2005 | Fogg | G06F 16/9038 |
| | | | | 715/848 |
| 2005/0192924 | A1 * | 9/2005 | Drucker | G06F 3/0483 |
| 2006/0149781 | A1 * | 7/2006 | Blankinship | G11B 27/28 |
| 2006/0170674 | A1 | 8/2006 | Tsubaki et al. | |
| 2006/0212833 | A1 * | 9/2006 | Gallagher | G06T 11/206 |
| | | | | 715/848 |
| 2007/0083818 | A1 * | 4/2007 | Drucker | G06F 16/435 |
| | | | | 715/767 |
| 2007/0124677 | A1 * | 5/2007 | de los Reyes | G06F 9/451 |
| | | | | 715/764 |
| 2009/0058822 | A1 * | 3/2009 | Chaudhri | G06F 3/14 |
| | | | | 345/173 |
| 2009/0087161 | A1 * | 4/2009 | Roberts | G11B 27/28 |
| | | | | 386/285 |
| 2009/0300530 | A1 * | 12/2009 | Falchuk | G11B 27/105 |
| | | | | 715/764 |
| 2011/0102424 | A1 * | 5/2011 | Hibbert | G06T 15/02 |
| | | | | 345/419 |
| 2011/0107220 | A1 * | 5/2011 | Perlman | H04N 21/2381 |
| | | | | 715/720 |
| 2012/0042251 | A1 * | 2/2012 | Rodriguez | G11B 27/034 |
| | | | | 715/723 |
| 2012/0098754 | A1 * | 4/2012 | Kim | H04N 1/0035 |
| | | | | 345/3.1 |
| 2012/0170642 | A1 * | 7/2012 | Braness | H04N 21/8455 |
| | | | | 375/E7.026 |
| 2013/0016122 | A1 * | 1/2013 | Bhatt | G06T 3/40 |
| | | | | 345/620 |
| 2013/0129307 | A1 * | 5/2013 | Choe | G06F 16/738 |
| | | | | 386/227 |
| 2014/0232873 | A1 * | 8/2014 | Meganathan | G08B 13/19671 |
| | | | | 348/152 |
| 2014/0313377 | A1 * | 10/2014 | Hampton | G06F 1/1686 |
| | | | | 348/241 |
| 2015/0058709 | A1 * | 2/2015 | Zaletel | G06F 16/252 |
| | | | | 715/202 |
| 2015/0173846 | A1 * | 6/2015 | Schneider | A61B 1/00042 |
| | | | | 600/424 |
| 2015/0227196 | A1 * | 8/2015 | Fujii | G02B 27/017 |
| | | | | 345/156 |
| 2015/0242404 | A1 * | 8/2015 | Underwood, IV | H04L 67/10 |
| | | | | 707/748 |
| 2015/0269643 | A1 * | 9/2015 | Riley | G06Q 30/0643 |
| | | | | 705/26.5 |
| 2017/0208245 | A1 | 7/2017 | Castillo et al. | |
| 2018/0040164 | A1 * | 2/2018 | Newman | H04N 23/698 |
| 2018/0084257 | A1 * | 3/2018 | Abbas | H04N 19/176 |
| 2018/0276800 | A1 * | 9/2018 | Abbas | G06T 5/92 |
| 2018/0349008 | A1 * | 12/2018 | Manzari | H04N 23/69 |
| 2019/0379876 | A1 * | 12/2019 | Hur | H04N 13/178 |
| 2020/0159394 | A1 * | 5/2020 | Chassen | G06F 16/54 |
| 2020/0329266 | A1 * | 10/2020 | Takaku | H04N 21/234327 |
| 2021/0256598 | A1 * | 8/2021 | Nunn | G06T 7/593 |

FOREIGN PATENT DOCUMENTS

| | | |
|---|---|---|
| CN | 110401766 A | 11/2019 |
| CN | 111935402 A | 11/2020 |
| CN | 112689088 A | 4/2021 |
| JP | 2008124826 A | 5/2008 |

OTHER PUBLICATIONS

First Office Action issued in related Chinese application No. 202011519313.X, Dec. 22, 2021, 9 pages.
Second Office Action issued in related Chinese application No. 202011519313.X, Sep. 2, 2022, 7 pages.
Decision of Rejection issued in related Chinese application No. 202011519313.X, Dec. 23, 2022, 5 pages.
Extended European Search Report issued in related European Application No. 21909257.4, mailed May 10, 2024, 9 pages.

* cited by examiner

IMAGE DISPLAY METHOD AND APPARATUS, AND ELECTRONIC DEVICE

CROSS-REFERENCE TO RELATED APPLICATIONS

This application is a continuation of International Application No. PCT/CN2021/138690, filed on Dec. 16, 2021, which claims priority to Chinese Patent Application No. 202011519313.X, filed on Dec. 21, 2020. The entire contents of each of the above-identified applications are expressly incorporated herein by reference.

TECHNICAL FIELD

This application pertains to the field of communications technologies, and specifically relates to an image display method and apparatus, and an electronic device.

BACKGROUND

With continuous improvement of a photographing function in an electronic device, the photographing function in the electronic device can already meet a photographing requirement of people in most scenes, and the photographing function has become one of the most frequently used functions of people in the electronic device. For example, the electronic device is a mobile phone. When a user takes a photo by using the mobile phone, a plurality of photos are often photographed at one time in a same scene. After the photographing ends, the user enters an album to find a plurality of photos in the scene, compares and selects the plurality of photos, and finally reserves a photo that is most satisfied by the user.

Because the process of selecting a photo needs to be performed by a user to enter the album, and then the foregoing plurality of photos are first searched for before comparison and selection, steps of the selection process are cumbersome, time-consuming, and inefficient.

SUMMARY

Embodiments of this application aim to provide an image display method and apparatus, and an electronic device.

According to a first aspect, an embodiment of this application provides an image display method. The method includes: in a case that a first three-dimensional model control is displayed on a photographing preview interface, receiving a first input performed by a user, where the first three-dimensional model control includes N display surfaces, and N is a positive integer; and displaying, by the electronic device on a first display surface in the N display surfaces in response to the first input, a first image photographed by a camera, where each display surface in the N display surfaces is used to display one image, and different display surfaces are used to display different images.

According to a second aspect, an embodiment of this application provides an image display apparatus. The apparatus includes a receiving module and a display module, where the receiving module is configured to receive a first input performed by a user in a case that a first three-dimensional model control is displayed on a photographing preview interface, where the first three-dimensional model control includes N display surfaces, and N is a positive integer; and the display module is configured to display, on a first display surface in the N display surfaces in response to the first input received by the receiving module, a first image photographed by a camera, where each display surface in the N display surfaces is used to display one image, and different display surfaces are used to display different images.

According to a third aspect, an embodiment of this application provides an electronic device. The electronic device includes a processor, a memory, and a program or an instruction that is stored in the memory and that can be run on the processor, where when the program or the instruction is executed by the processor, the steps of the method in the first aspect are implemented.

According to a fourth aspect, an embodiment of this application provides a readable storage medium. The readable storage medium stores a program or an instruction, and when the program or the instruction is executed by a processor, the steps of the method in the first aspect are implemented.

According to a fifth aspect, an embodiment of this application provides a chip. The chip includes a processor and a communications interface, the communications interface is coupled to the processor, and the processor is configured to run a program or an instruction to implement the method in the first aspect.

According to a sixth aspect, an embodiment of this application provides a computer program product. The program product is stored in a storage medium, and the program product is executed by at least one processor to implement the method in the first aspect.

In the embodiments of this application, in a case that a first three-dimensional model control including N display surfaces is displayed on a photographing preview interface, an electronic device may display, on a first display surface of the first three-dimensional model control after receiving a first input, a first image photographed by a camera, where each display surface in the N display surfaces is used to display one image, and different display surfaces are used to display different images.

DETAILED DESCRIPTION

Figure 1:
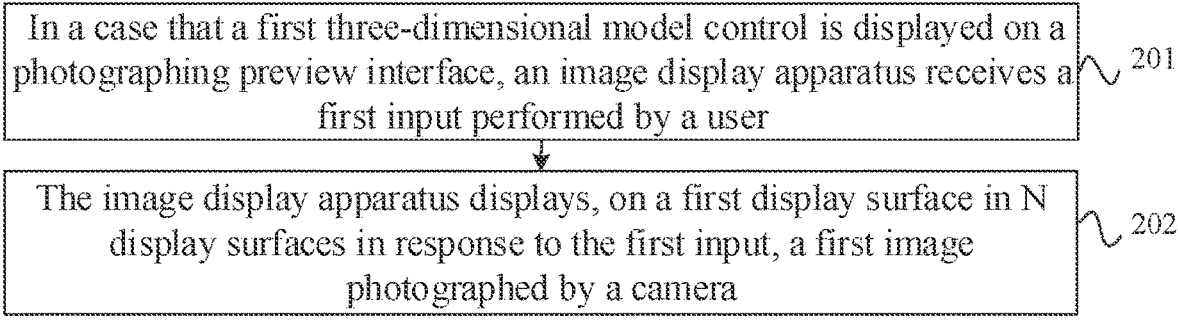
FIG. 1 is a schematic flowchart of an image display method according to an embodiment of this application.

The following describes the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first," "second," and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first," "second," and the like are usually of a same type, and the number of objects is not limited. For example, there may be one or more first objects. In addition, in the specification and the claims, "and/or" represents at least one of connected objects, and a character "/" generally represents an "or" relationship between associated objects.

With reference to the accompanying drawings, an image display method provided in the embodiments of this application is described in detail by using specific embodiments and application scenes.

The image display method provided in the embodiments of this application may be applied to a scene in which a photo needs to be selected after a plurality of photos are photographed.

In a scene in which a plurality of photos are photographed, it is assumed that a user A uses a photographing application of an electronic device to photograph X photos at one time. After the photographing is completed, the user A may view the X photos, and select Y photos that are relatively satisfactory to the user A for saving or sharing. In the foregoing photo viewing process, the user A needs to exit the current photographing application and enter an album application, find display locations of the X photos in the album, scroll back and forth for viewing and comparison, and finally select the Y photos for saving or sharing. Because viewing and comparison processes can be further performed only when the user exits the photographing application and find the display locations of the photographed photos in the album application, steps of the viewing and comparison are relatively cumbersome and time-consuming.

In the embodiments of this application, in a case that a first three-dimensional model control that includes N display surfaces is displayed on a photographing preview interface of a photographing application, after receiving a photographing input performed by the user A, an electronic device may directly display, on a first display surface of the first three-dimensional model control, a photo photographed by a camera, where each display surface in the N display surfaces is used to display one photo, and different display surfaces are used to display different photos. In this way, the user A may directly view and compare the X photos A by viewing a display surface of the first three-dimensional model control, without exchanging between different applications, thereby saving steps of viewing and comparing different photos, and meeting a user requirement of customizing a display effect of a photo set in more scenes while reducing interaction time.

As shown in FIG. 1, an embodiment of this application provides an image display method. The method includes step 201 and step 202.

Step 201: In a case that a first three-dimensional model control is displayed on a photographing preview interface, an image display apparatus receives a first input performed by a user.

In this embodiment of this application, the first three-dimensional model control includes N display surfaces, and N is a positive integer.

In this embodiment of this application, the N display surfaces of the first three-dimensional model control may be used to display an image in the electronic device. The image in the electronic device may be a photo photographed by using a camera when the electronic device uses a photographing application, or may be an image stored in the electronic device by the user.

In this embodiment of this application, a quantity of display surfaces of the first three-dimensional model control may be the same as a quantity of display surfaces of a three-dimensional model. For example, if the first three-dimensional model control is a hexahedron control, the hexahedron control may include six display surfaces.

In this embodiment of this application, the first three-dimensional model control may be suspended on the photographing preview interface.

In this embodiment of this application, the first three-dimensional model control may be a control used to trigger the electronic device to perform a photographing function.

In an embodiment of this application, a three-dimensional model of the first three-dimensional model control may include a plurality of different types of three-dimensional models.

For example, the three-dimensional model corresponding to the first three-dimensional model control may include any one of the following: a three-dimensional polyhedron model, a three-dimensional circular model, or a multi-layer cascading model.

Figure 2A:
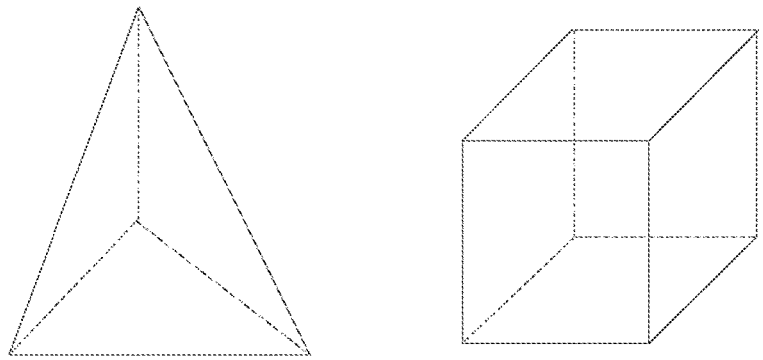
FIG. 2A is a first schematic diagram of an interface to which an image display method is applied according to an embodiment of this application.

In an example, when the three-dimensional model is a three-dimensional polyhedron model, the three-dimensional polyhedron model may be a three-dimensional model composed of a plurality of geometric surfaces. For example, as shown in FIG. 2A, the three-dimensional model may be a tetrahedron or a hexahedron.

Further, one geometric surface of a control corresponding to the three-dimensional polyhedron model corresponds to one display surface, and each display surface may be used to display different images. For example, the three-dimensional polyhedron model control is a hexahedron model control. If the hexahedron model control corresponding to the hexahedron model includes six display surfaces, six different images may be displayed on the six display surfaces.

Figure 2B:
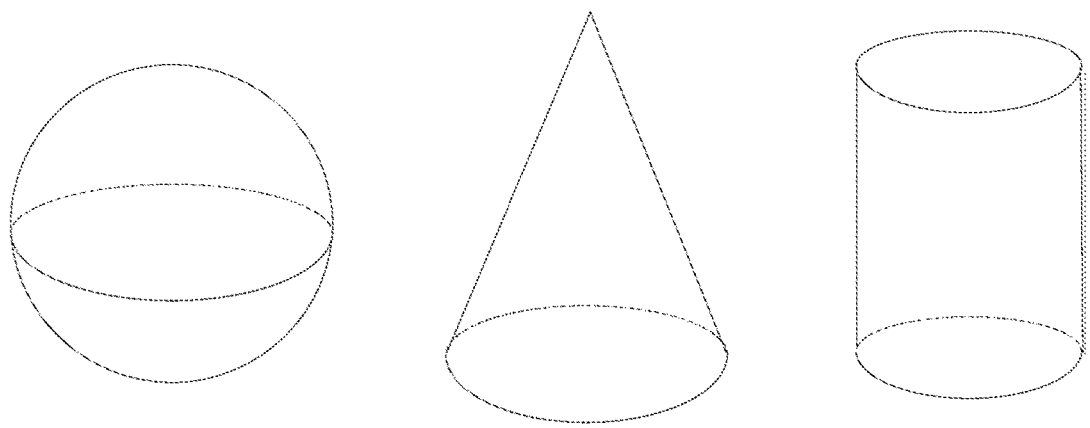
FIG. 2B is a second schematic diagram of an interface to which an image display method is applied according to an embodiment of this application.

In an example, when the three-dimensional model is a three-dimensional circular model, the three-dimensional circular model may include at least one curved geometric surface. For example, as shown in FIG. 2B, the three-dimensional model may be a sphere, a cone, or a cylinder.

Further, each display surface of a control corresponding to the three-dimensional circular model may be used to display different images, and a curved geometric surface of the control corresponding to the three-dimensional circular model may be used to display a panoramic image. For example, a cone surface of a cone model control corresponding to the cone model may be used to display a panoramic image.

Figure 2C:
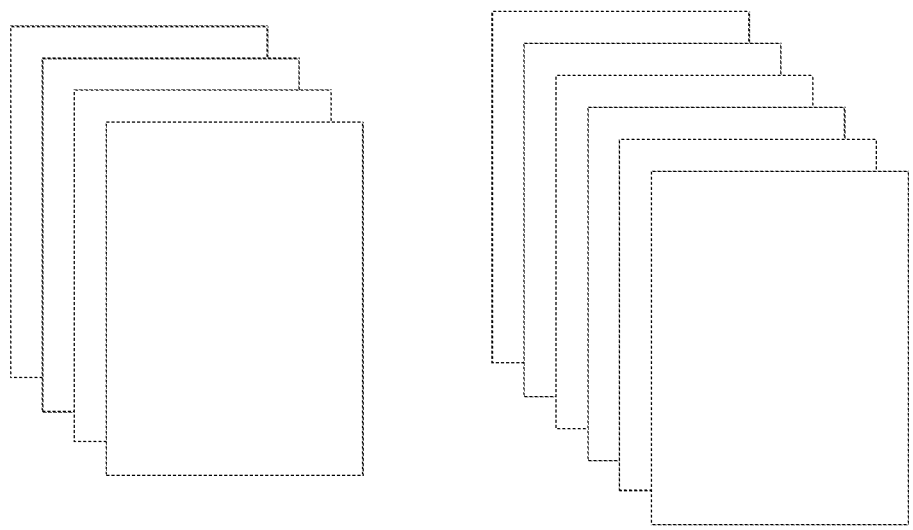
FIG. 2C is a third schematic diagram of an interface to which an image display method is applied according to an embodiment of this application.

In an example, when the three-dimensional model is a multi-layer cascading model, the multi-layer cascading model may be a three-dimensional model composed of a plurality of display surfaces. Different cascading quantities may constitute different cascading models. For example, as shown in FIG. 2C, the three-dimensional model may be a four-layer cascading model and a six-layer cascading model.

Further, a corresponding control of the multi-layer cascading model may be used to display an image in a continuous photographing mode, and each display surface of a multi-layer cascading model control corresponding to the multi-layer cascading model may display different images.

In this way, the image display apparatus may display images in a plurality of manners by using a plurality of different models, thereby increasing a quantity of images that can be photographed by the user by using the electronic device, and enriching a manner of viewing the images and further editing the images.

In this embodiment of this application, the first three-dimensional model control may be suspended on a display interface of the electronic device. The display interface may be a photographing preview interface, or may be an image display interface.

In this embodiment of this application, the photographing preview interface may be a dynamic preview interface after the electronic device enters a photographing application and enables a camera.

In this embodiment of this application, the first input may be a touch input, for example, a tap input, a press input, or a slide input, may be an input of a specific gesture, or may be a voice input. This is not limited in this embodiment of this application.

In this embodiment of this application, the first input may be an input used to trigger the electronic device to perform a photographing operation.

For example, the first input may be an input performed by the user on a photographing control on the photographing preview interface. The photographing control may be a virtual photographing control on the photographing preview interface, for example, a shutter control, or a physical photographing key on the electronic device, for example, a volume increase key on the electronic device that may be used to trigger execution of a photographing operation.

For example, before receiving the first input, the electronic device may receive a touch input that is performed on a control corresponding to a photo set mode on the photographing preview interface by a user, to enter the photo set mode in the photographing application. After entering the photo set mode, the electronic device may directly display the first three-dimensional model control on the photographing preview interface. The photo set mode may be a photographing mode in the photographing application. When the electronic device is in the photo set mode, a three-dimensional model prestored in the photographing application may be displayed on the photographing preview interface.

In an example, the three-dimensional model corresponding to the first three-dimensional model control may be a three-dimensional model preset by the electronic device, or may be a three-dimensional model customized by the user.

Step 202: The image display apparatus displays, on a first display surface in N display surfaces in response to the first input, a first image photographed by a camera.

In this embodiment of this application, each display surface in the N display surfaces is used to display one image, and different display surfaces are used to display different images.

In this embodiment of this application, the first display surface may be a display surface facing the user in the first three-dimensional model control. That is, the first three-dimensional model control may be a display surface with a largest display area on the display interface.

In this embodiment of this application, the first image may be an image photographed after the electronic device receives the first input. For example, the first image may be a photo photographed after the electronic device triggers the camera to be enabled.

Figure 3A:
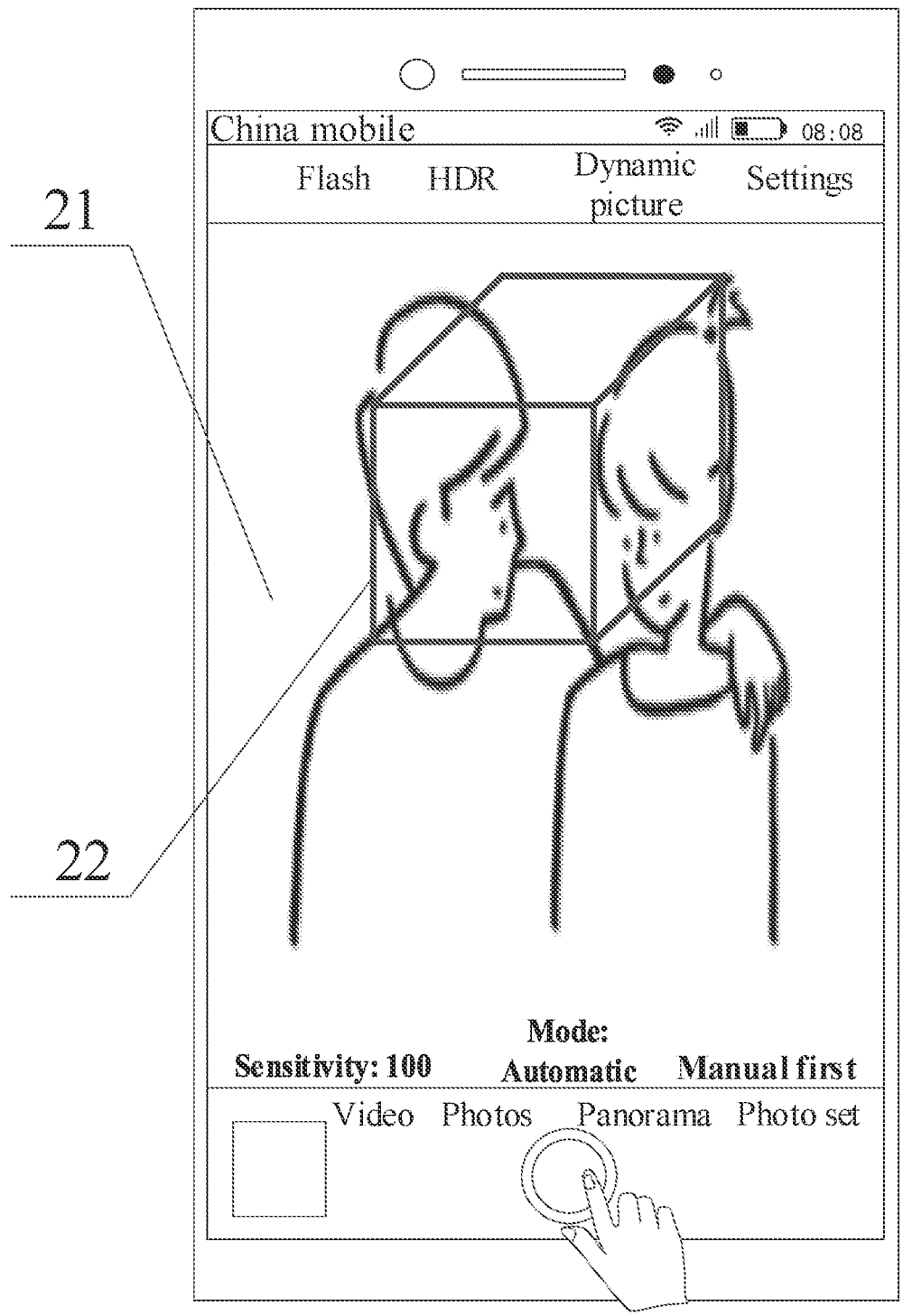
FIG. 3A is a fourth schematic diagram of an interface to which an image display method is applied according to an embodiment of this application.
Figure 3B:
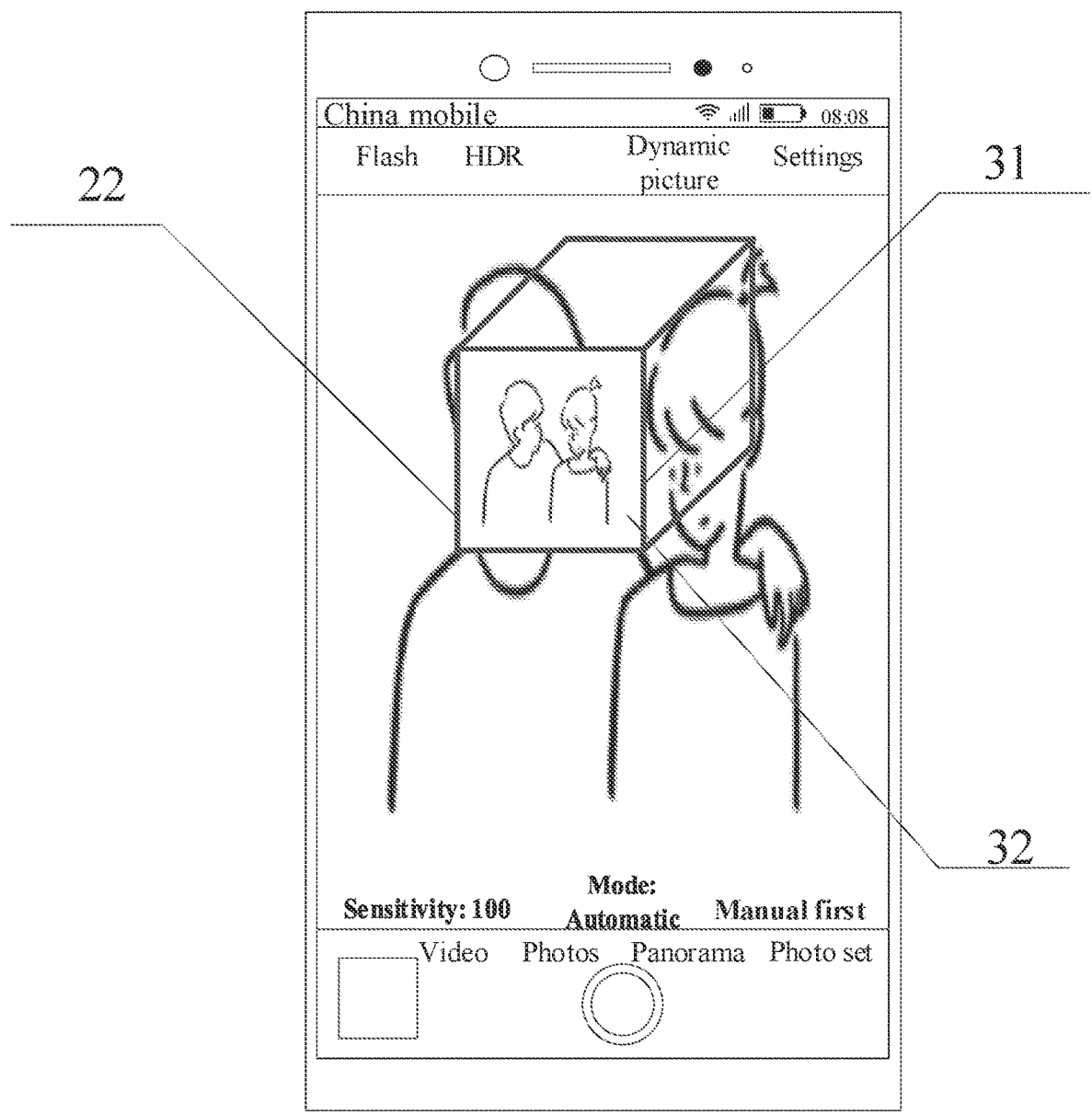
FIG. 3B is a fifth schematic diagram of an interface to which an image display method is applied according to an embodiment of this application.

Example 1: The image display method in this embodiment of this application may be applied to a scene in which the user needs to view a photo photographed by the user after photographing the photo by using the electronic device, and therefore the user may directly view, by using the first three-dimensional model control, the photo photographed by the user without entering an album. As shown in FIG. 3A, in a case that the electronic device displays a hexahedron model control 22 on a photographing preview interface 21, after the electronic device receives a tap input (that is, the foregoing first input) of the user on the shutter control, as shown in FIG. 3B, a photographed image 32 (that is, the foregoing first image) may be displayed on a first display surface 31 facing the user in the hexahedron model control 22.

According to the image display method provided in this embodiment of this application, in a case that a first three-dimensional model control including N display surfaces is displayed on a photographing preview interface, an image display apparatus may display, on a first display surface of the first three-dimensional model control after receiving a first input, a first image photographed by a camera, where each display surface in the N display surfaces is used to display one image, and different display surfaces are used to display different images. In this way, a plurality of images can be directly viewed by viewing different display surfaces of the first three-dimensional model control on the photographing preview interface without a need to re-enter an album to search for an image, thereby reducing an interaction time and meeting a requirement of a user to customize a display effect of a photo set in more scenes.

For example, after the image display apparatus displays an image on a display surface of the first three-dimensional model control, the image display apparatus may display the first three-dimensional model control in full screen after receiving a browsing input performed by a user, so that the user can easily view images.

In an example, the browsing input may be an input performed by a user on a browsing control on the photographing preview interface, or may be a touch input performed by the user on the first three-dimensional model control.

Further, the user may perform a viewing input on the first three-dimensional model control displayed in full screen, to view images of different display surfaces on the first three-dimensional model control.

For example, the viewing input may be a slide input.

In an example, when a first three-dimensional model corresponding to the first three-dimensional model control is a polyhedron three-dimensional model, the slide input may be controlling the polyhedron three-dimensional model to rotate, so that the user can view images of different display surfaces.

In another example, when the three-dimensional model corresponding to the first three-dimensional model control is a multi-layer cascading model, the slide input may control a display surface in the middle of the multi-layer cascading model to be displayed on the top of a multi-layer display surface.

For example, the viewing input may be a double-tap input, so that a single image on a display surface may be zoomed in on a display screen.

In an embodiment of this application, when the user is not satisfied with the first three-dimensional model corresponding to the current first three-dimensional model control, different three-dimensional models may be exchanged, so that the first three-dimensional model is exchanged to a second three-dimensional model, and an image on the first three-dimensional model control is exchanged and displayed on a second three-dimensional model control.

For example, after the first image photographed by the camera is displayed in step 202, the image display method provided in this embodiment of this application further includes the following step A1 and step A2:

Step A1: The image display apparatus receives a second input performed by a user.

Step A2: In response to the second input, the image display apparatus updates the first three-dimensional model control to a second three-dimensional model control, and displays, on M display surfaces of the second three-dimensional model control, M images displayed on M display surfaces of the first three-dimensional model control.

For example, the second three-dimensional model control includes X display surfaces, each display surface in the X display surfaces is used to display one image, different display surfaces are used to display different images, X and M are positive integers, and X and N are greater than or equal to M.

For example, the three-dimensional model corresponding to the first three-dimensional model control and a three-dimensional model corresponding to the second three-dimensional model control may be different three-dimensional models. For example, the three-dimensional model corresponding to the first three-dimensional model control may be a hexahedron model, and the three-dimensional model corresponding to the second three-dimensional model control may be an octahedron model.

It should be noted that the three-dimensional model corresponding to the first three-dimensional model control and the three-dimensional model corresponding to the second three-dimensional model control are a same type of three-dimensional models. For example, if the three-dimensional model corresponding to the first three-dimensional model control is a three-dimensional polyhedron model, the three-dimensional model corresponding to the second three-dimensional model control is also a three-dimensional polyhedron model. Similarly, if the three-dimensional model corresponding to the first three-dimensional model control is a three-dimensional circular model, the three-dimensional model corresponding to the second three-dimensional model control is also a three-dimensional circular model.

For example, for descriptions of the second input, refer to the foregoing descriptions of the first input. Details are not described herein again.

For example, the second input may be used to select the three-dimensional model corresponding to the second three-dimensional model control.

In an example, in a case that a three-dimensional model sign of the three-dimensional model corresponding to the second three-dimensional model control may be directly displayed on the photographing preview interface, the user may exchange the first three-dimensional model control to the second three-dimensional model control by performing the second input on the three-dimensional model sign corresponding to the second three-dimensional model control.

In another example, in a case that the three-dimensional model corresponding to the three-dimensional model control is not directly displayed on the photographing preview interface, the user may first trigger the electronic device to display a prestored three-dimensional model corresponding to a three-dimensional model control, and then exchange the first three-dimensional model control to the second three-dimensional model control by performing the second input on the three-dimensional model corresponding to the second three-dimensional model control.

For example, after the image display apparatus updates the first three-dimensional model control to the second three-dimensional model control, the M images displayed on the display surfaces of the first three-dimensional model control may be moved and displayed on the M display surfaces of the second three-dimensional model control. It can be understood that the quantity of display surfaces of the second three-dimensional model control is greater than or equal to the quantity of display surfaces of the first three-dimensional model control.

In an example, the image display apparatus may number display surfaces of the first three-dimensional model control according to a display sequence of display surfaces of the first three-dimensional model control, and display surface numbers of display surfaces of the second three-dimensional model control are prestored.

If the quantity of the display surfaces of the first three-dimensional model control is greater than or equal to the quantity of the display surfaces of the second three-dimensional model control, in a process of three-dimensional model control exchanging, images displayed on the display surfaces of the first three-dimensional model control may be successively displayed in a sequence of the prestored display surface numbers of the display surfaces of the second three-dimensional model control.

If the quantity of display surfaces of the first three-dimensional model control is less than the quantity of display surfaces of the second three-dimensional model control, in a process of three-dimensional model control exchanging, images displayed on the display surfaces of the first three-dimensional model control may be successively displayed in a sequence of the display surface numbers prestored in the display surfaces of the second three-dimensional model control, and an image that fails to be displayed is no longer displayed on the second three-dimensional model control, and is automatically saved in an album, or is deleted and is no longer retained. This is not limited in this embodiment of this application.

Figure 4A:
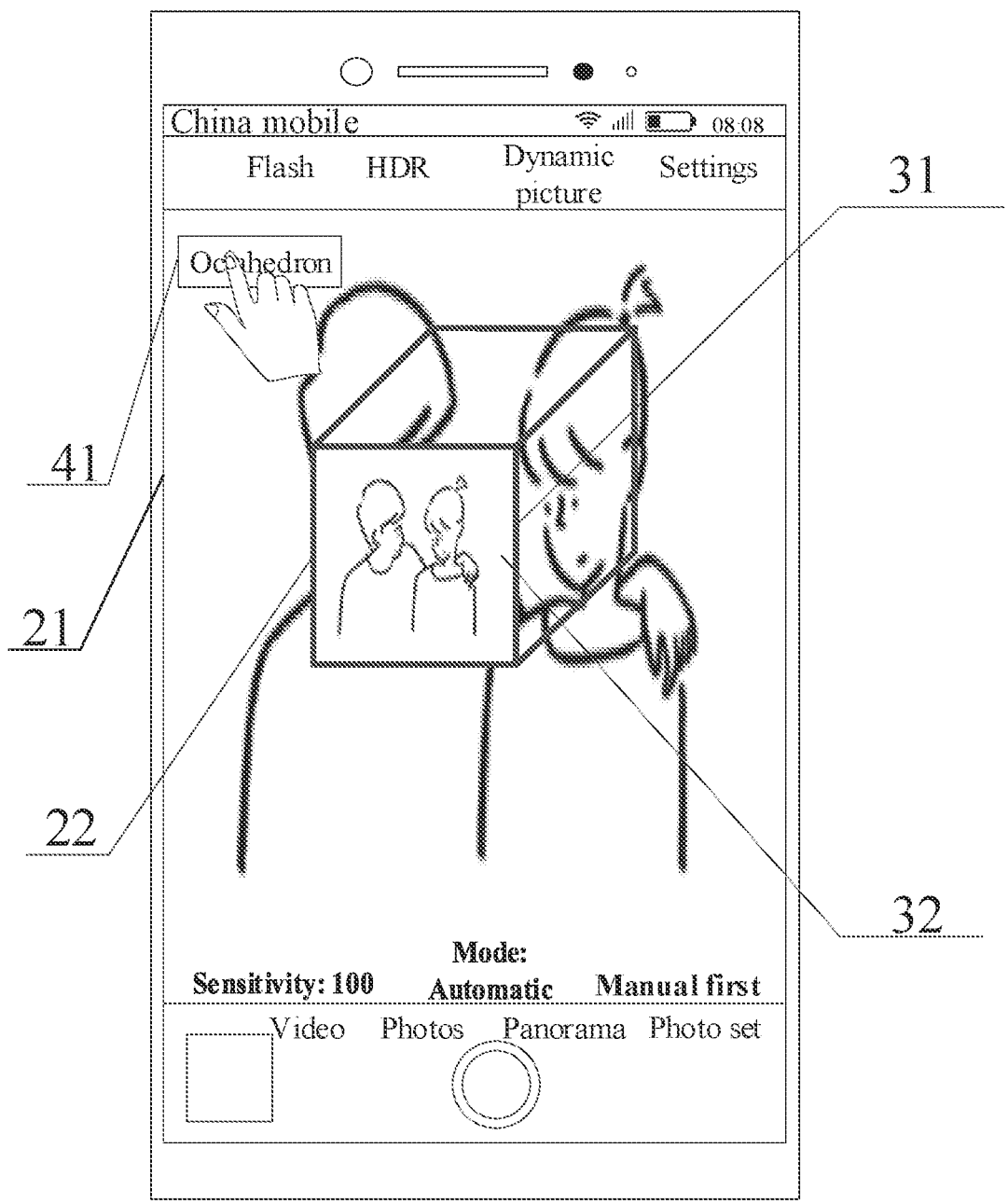
FIG. 4A is a sixth schematic diagram of an interface to which an image display method is applied according to an embodiment of this application.
Figure 4B:
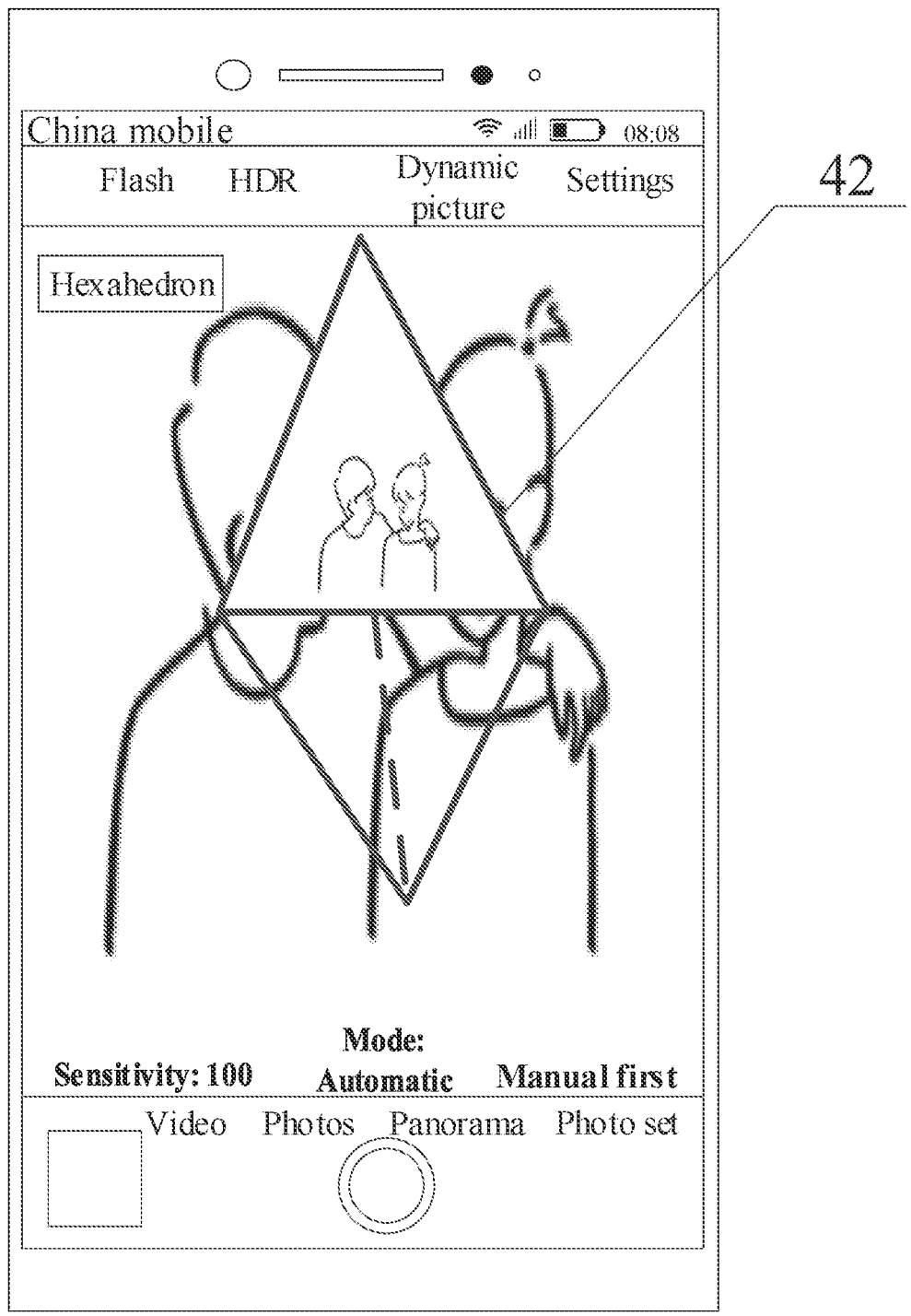
FIG. 4B is a seventh schematic diagram of an interface to which an image display method is applied according to an embodiment of this application.

Example 2: The image display method in this embodiment of this application may be applied to a scene in which the electronic device needs to update the first three-dimensional model control to the second three-dimensional model control after displaying a photographed photo on the first three-dimensional model control, and simultaneously updates an image on the first three-dimensional model control to the second three-dimensional model control. With reference to the foregoing example 1, as shown in FIG. 4A, after the electronic device receives a tap input (that is, the foregoing second input) on an octahedron model sign 41 on the photographing preview interface 21, as shown in FIG. 4B, the electronic device exchanges the hexahedron model control 22 on the photographing preview interface 21 to an octahedron model control 42 (the second three-dimensional model control), and moves an image on a display surface of the hexahedron model control 22 to the octahedron model control 42.

In this way, the user can flexibly adjust, according to a requirement of the user, a display type of a three-dimensional model corresponding to a three-dimensional model control in then electronic device, so that the quantity of images displayed on the three-dimensional model control can be adjusted, thereby adjusting an image display effect, and facilitating the user to compare images displayed on the three-dimensional model control.

Further, in an embodiment of this application, after exchanging different three-dimensional model controls, the electronic device may directly display exchanged three-dimensional model controls on the display interface in full screen.

After step A2, the image display method provided in this embodiment of this application includes the following step B:

Step B: In response to the second input, the image display apparatus exchanges the first three-dimensional model control to the second three-dimensional model control, and displays the second three-dimensional model control in full screen.

In this way, after the user exchanges the first three-dimensional model control to the second three-dimensional model control, the electronic device may automatically display an exchanged three-dimensional model control on the display screen in full screen for the user to view the exchanging effect.

In an embodiment of this application, after receiving the first input performed by the user, the electronic device may continue to receive an input performed by a user, and display a new image on a target display surface of the first three-dimensional model control.

After the first image photographed by the camera is displayed in step 202, the image display method provided in this embodiment of this application may further include the following step C1 and step C2:

Step C1: The image display apparatus receives a third input performed by a user.

Step C2: The image display apparatus displays, on a target display surface in the N display surfaces in response to the third input, a second image photographed by the camera.

For example, for the third input, refer to the foregoing descriptions of the first input. Details are not described herein again.

For example, the third input may be used to trigger the electronic device to photograph an image.

For example, the second image is an image different from the first image.

For example, the target display surface may be a first display surface or a second display surface of the electronic device. The first display surface and the second display surface are different display surfaces in the first three-dimensional model control.

In this way, the image display apparatus may display a plurality of different images in a photo set by using different display surfaces of the first three-dimensional model control, that is, more images may be displayed by using one three-dimensional model control. Therefore, the user does not need to specifically search for different photos in the photo set, thereby facilitating the user to view a photo, and further performing another operation on the photo in the photo set.

Further, in an embodiment of the present disclosure, after displaying, on the first display surface, the first image photographed by the camera, the electronic device may control the first three-dimensional model control to rotate, change the first display surface of the first three-dimensional model control to the second display surface, continue to photograph a picture, and display the second image on the first three-dimensional model control.

For example, in this embodiment of this application, the third input includes a slide input, a sliding start location of the slide input is located on the first display surface of the first three-dimensional model control, and a sliding end location of the slide input is located on a second display surface of the first three-dimensional model control; and the second display surface is different from the first display surface. On this basis, step C2 in the image display method provided in this embodiment of this application may include the following step D1 to step D3:

Step D1: In response to the foregoing third input, the image display apparatus controls the first three-dimensional model control to rotate, where the second display surface is a focus display surface of the rotated first three-dimensional model control.

For example, the focus display surface is a display surface with a largest visible area.

Step D2: The image display apparatus receives a fourth input performed by the user.

Step D3: The image display apparatus displays, on the target display surface in the N display surfaces in response to the fourth input, the second image photographed by the camera.

For example, the target display surface includes the first display surface or the second display surface.

For example, for the fourth input, refer to the foregoing descriptions of the first input. Details are not described herein again.

In this way, through the fourth input on the electronic device, the user may control the electronic device to re-photograph an image on the first display surface or the second display surface of the first three-dimensional model control, thereby reducing steps of an operation of re-photographing an image on each display surface of the first three-dimensional model control by the user.

For example, the fourth input may include two input manners. A first input manner may be an input performed by a user on the electronic device, and the second input manner may be an input performed by a user on the second display surface.

In the first input manner, the fourth input may be an input in which press duration of the user on the electronic device is less than preset duration.

For example, after the image display apparatus receives an input performed by the user, the target display surface is the second display surface, that is, the electronic device may directly display the second image on the second display surface.

In an example, the fourth input may be an input performed by the user on the photographing control.

On this basis, further, in a case that the press duration of the press input is less than the preset duration, the image display apparatus displays, on the second display surface, the second image photographed by the camera.

In this way, by rotating the first three-dimensional model control and performing an input operation on the photographing control, the user can control the electronic device to directly display the second image on the second display surface, so that the user can subsequently compare different images.

Figure 5A:
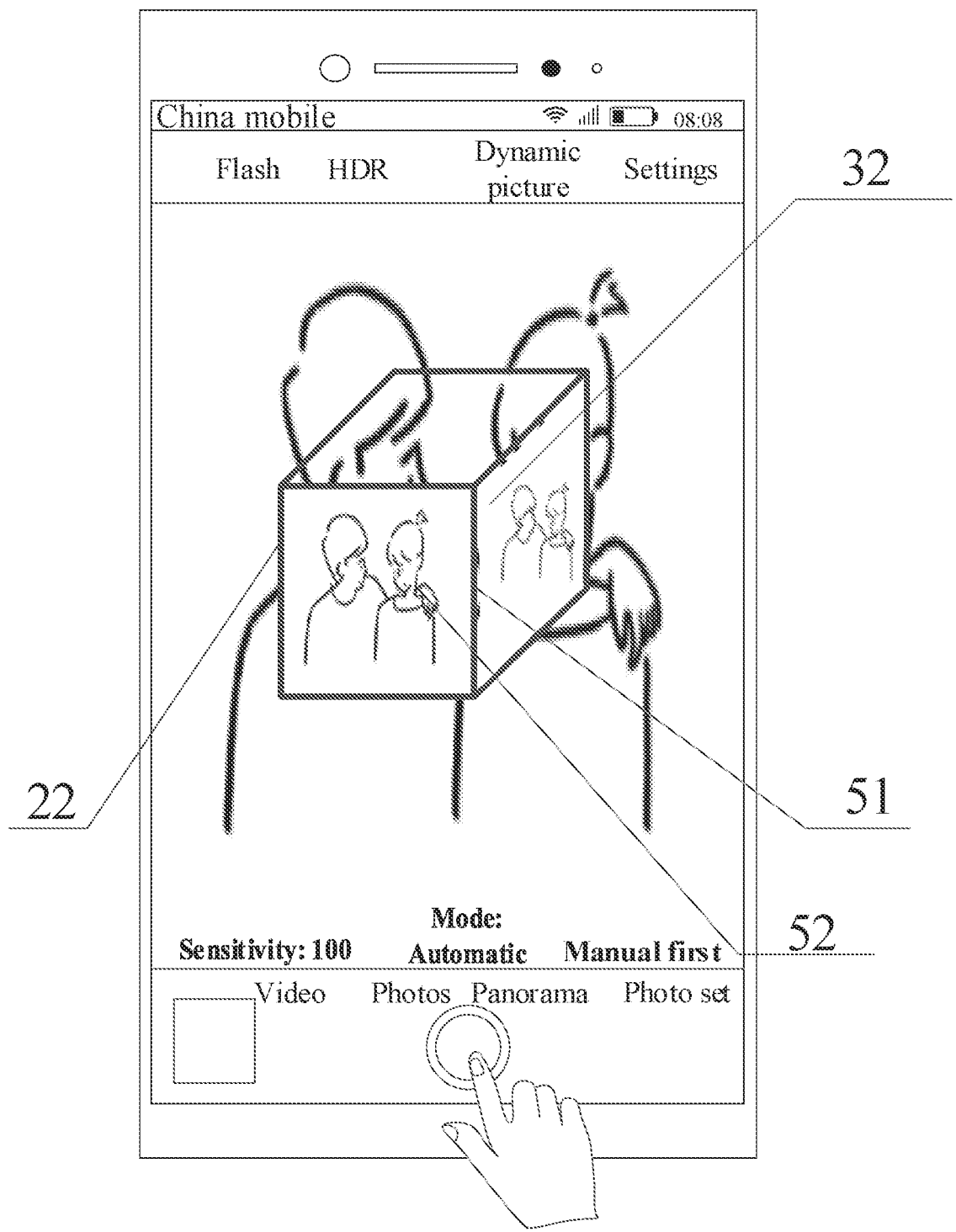
FIG. 5A is an eighth schematic diagram of an interface to which an image display method is applied according to an embodiment of this application.
Figure 5B:
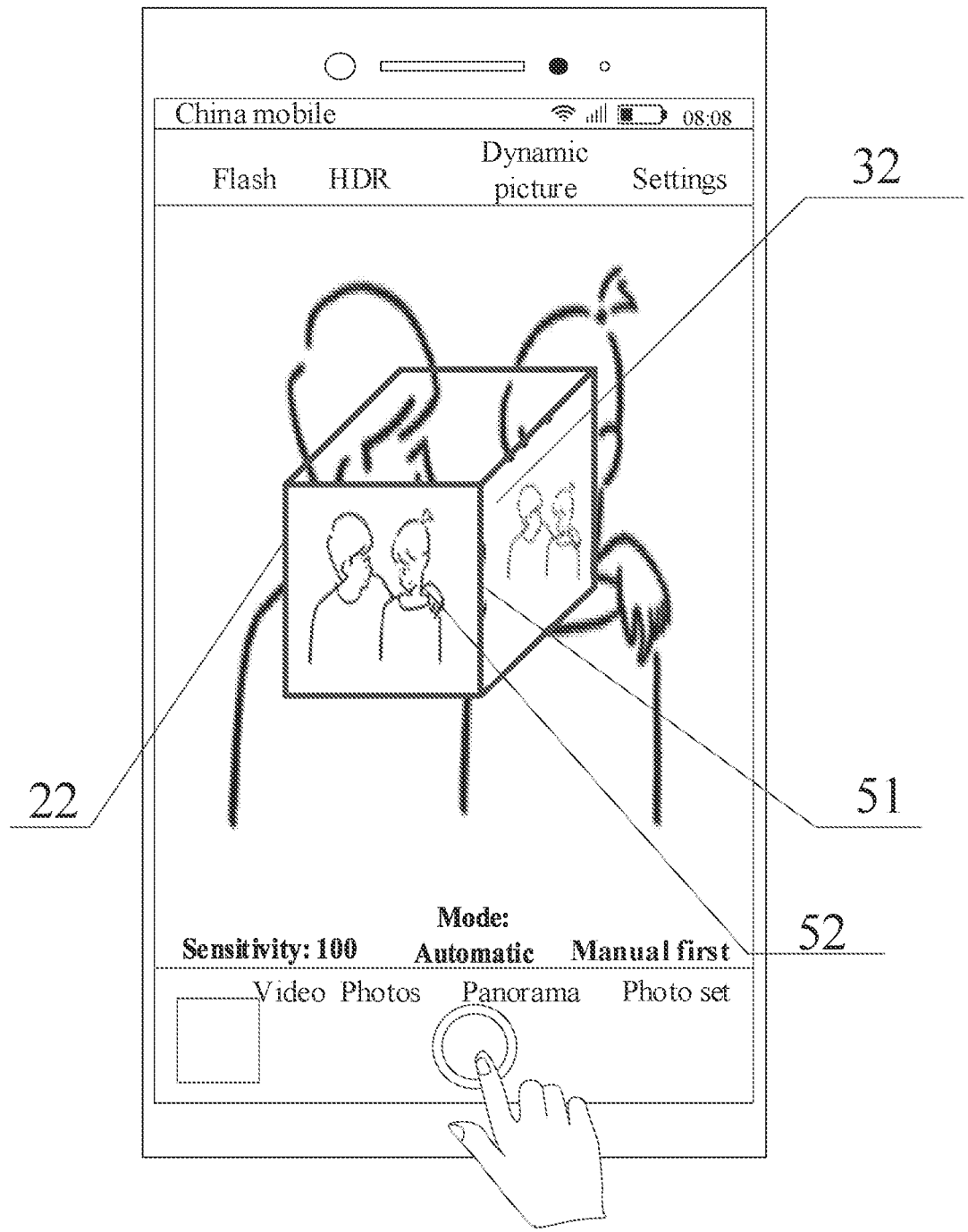
FIG. 5B is a ninth schematic diagram of an interface to which an image display method is applied according to an embodiment of this application.

Example 3: The image display method in this embodiment of this application may be applied to a scene in which if one photo is already displayed on the first display surface of the first three-dimensional model control, when the user continues to photograph a photo, a current photographed photo needs to be directly displayed on the second display surface of the first three-dimensional model control. With reference to the foregoing example 1, as shown in FIG. 5A, after the electronic device receives a rightward slide input performed by the user on a hexahedron three-dimensional control 22, the hexahedron three-dimensional control 22 slides rightward, and is rotated from the first display surface 31 to the second display surface 51 on the display interface. In this case, as shown in FIG. 5B, after the user performs a tap input (that is, the foregoing fourth input) on the shutter control (that is, the foregoing photographing control), the electronic device directly displays, on the second display surface 51, a new image 52 (that is, the foregoing second image) photographed by the camera.

In the second input manner, the fourth input may be an input in which the press duration of the user on the electronic device is greater than or equal to the preset duration.

For example, after the image display apparatus receives an input performed by the user on the second display surface, the fourth input may trigger the electronic device to display the first image on the first display surface.

For example, the fourth input includes a long-press input performed by the user on the second display surface.

On this basis, further, in a case that the press duration of the press input is greater than or equal to the preset duration, the image display apparatus displays, on the first display surface, the second image photographed by the camera.

For example, when images are displayed on both the first display surface and the second display surface, if the user has viewed the images on the first display surface and the image on the second display surface and is not satisfied with the image on the first display surface, the image on the first display surface may be directly replaced through a long-press input whose duration is greater than or equal to preset duration on the second display surface.

For example, the preset duration may be customized by the user, or may be preset by the electronic device.

Figure 6:
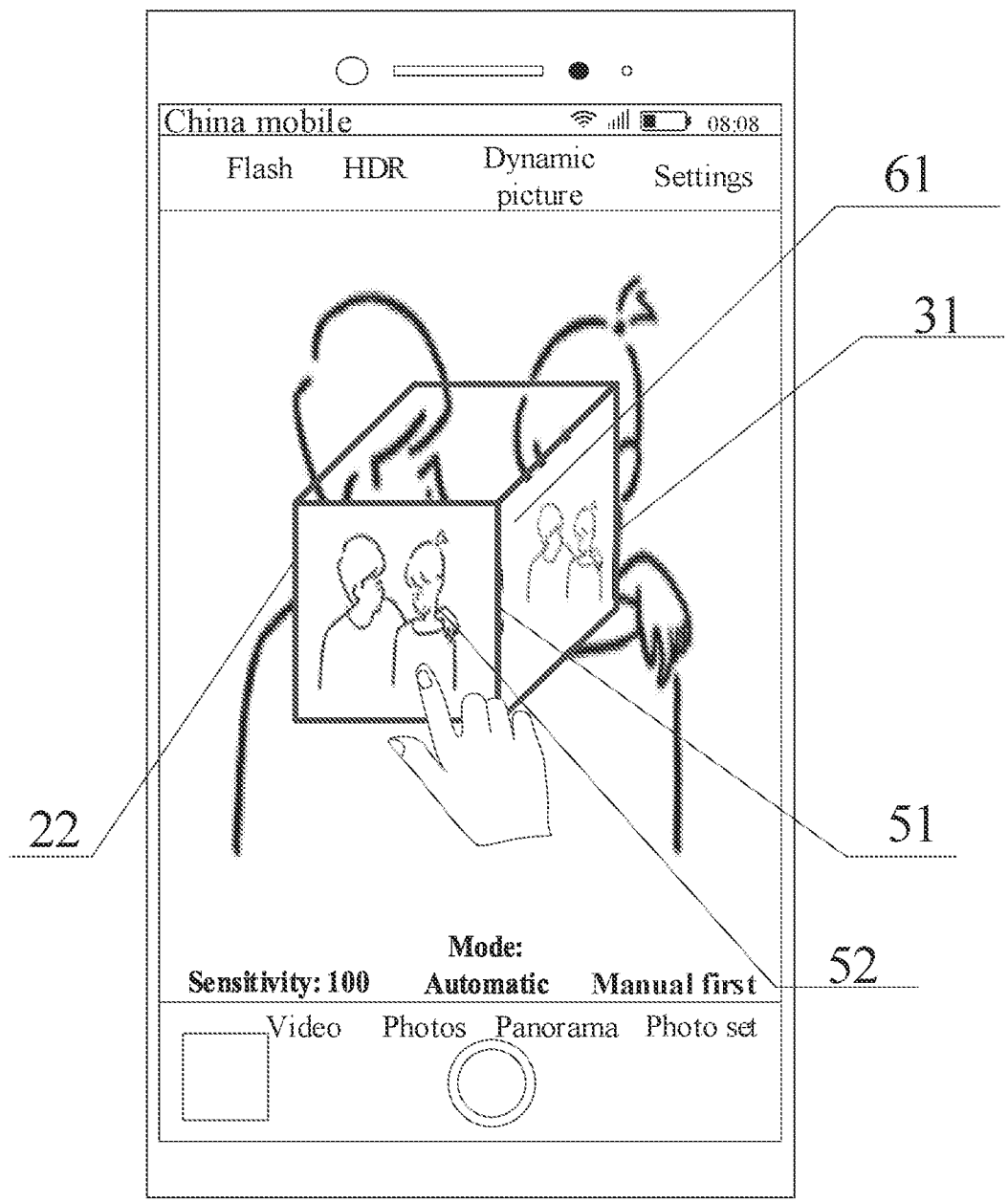
FIG. 6 is a tenth schematic diagram of an interface to which an image display method is applied according to an embodiment of this application.

Example 4: The image display method in this embodiment of this application may be applied to a scene in which if one photo is already displayed on each of the first display surface and the second display surface of the first three-dimensional model control, when the user rotates the first three-dimensional model control to the second display surface, the user is not satisfied with the photo on the first display surface, and needs to update the photo on the first display surface. With reference to the foregoing example 3, as shown in FIG. 6, when a second display surface 52 faces the user and the user wants to replace an image displayed on the first display surface 31, the user may perform a long-press input (that is, the foregoing fourth input) on the second display surface 52. When the long-press input is greater than 2 seconds (that is, the foregoing preset duration), the electronic device receives the long-press input, and enables the camera to photograph a new image 61 (that is, the foregoing second image). The image 61 is to replace the image 32 and is displayed on the first display surface 31.

In this way, after the user completes viewing the images displayed on the first display surface and the second display surface, if the user is not satisfied with the image displayed on the first display surface, by rotating the first three-dimensional model control and performing the press input on the second display surface for the preset duration, the user may control the electronic device to directly replace the first image displayed on the first display surface with the second image without a need to rotate to the first display surface. Therefore, steps of the operation are reduced, and efficiency of photographing an image by using the electronic device is improved.

Further, in an embodiment of this application, after the electronic device displays, on the first display surface, the first image photographed by the camera, the first three-dimensional model control is not rotated, and the first display surface is still displayed on the display interface of the first three-dimensional model control. In this case, if the user continues to photograph a picture, the photographed second image replaces the first image and is directly displayed on the first display surface.

For example, step C1 may include the following step E1:

Step E1: The image display apparatus receives the third input performed by the user in a case that a focus display surface of the first three-dimensional model control is the first display surface.

On this basis, the foregoing step C2 of the image display method provided in this embodiment of this application may include the following step E2:

Step E2: The image display apparatus replaces the first image displayed on the first display surface with the second image photographed by the camera.

For example, the target display surface is the first display surface.

In an example, the third input may be a tap input performed by the user on the photographing control.

Figure 7A:
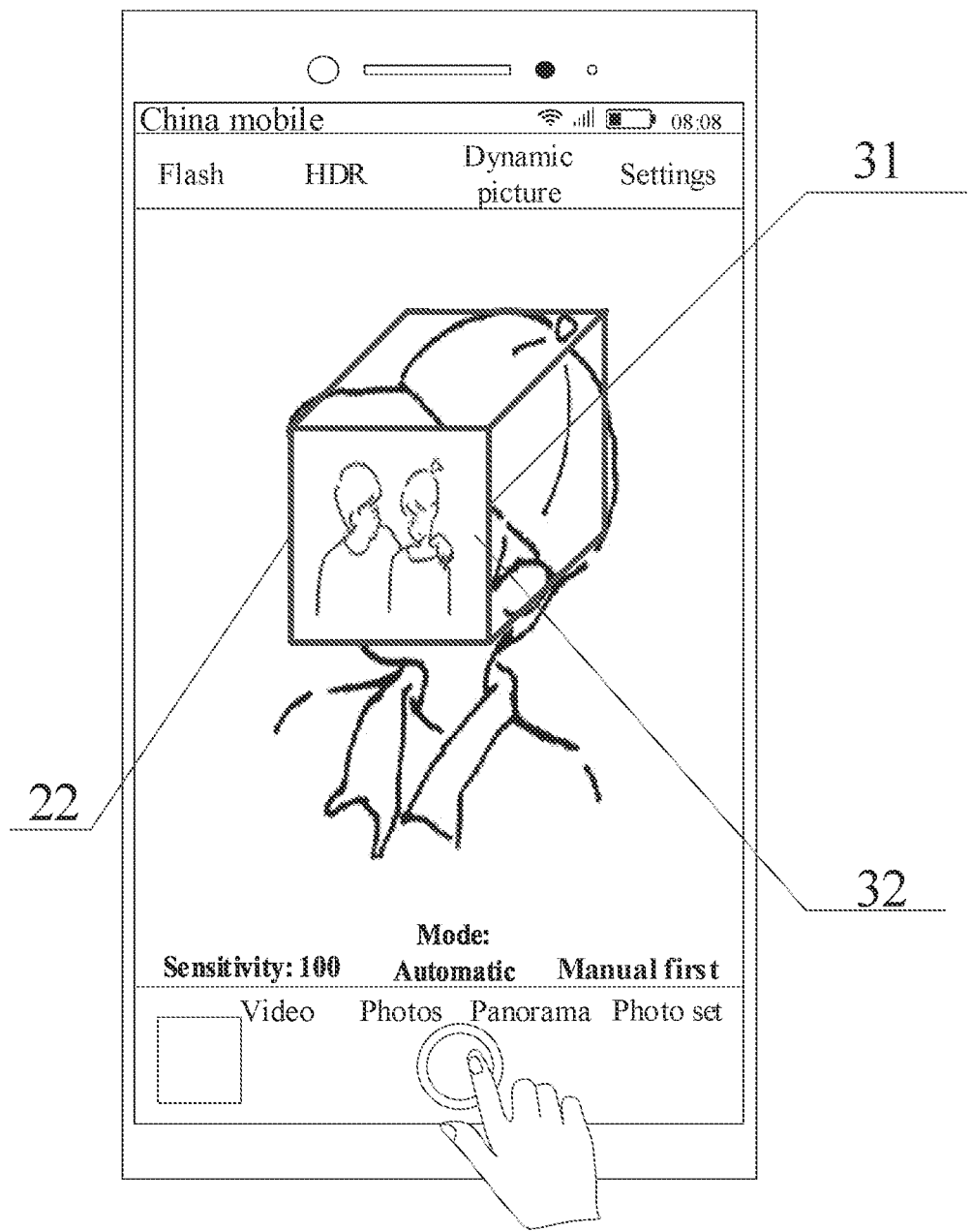
FIG. 7A is an eleventh schematic diagram of an interface to which an image display method is applied according to an embodiment of this application.
Figure 7B:
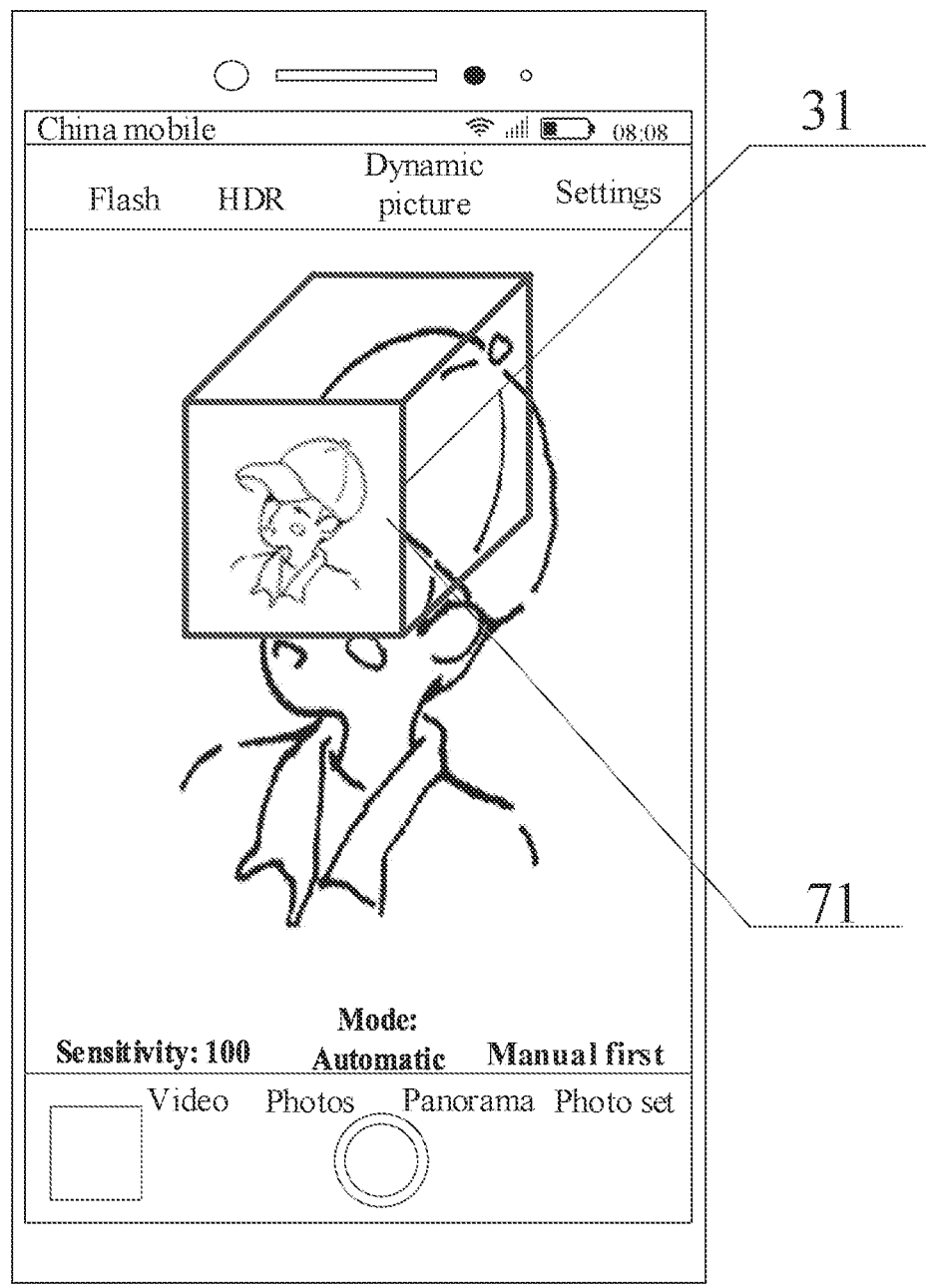
FIG. 7B is a twelfth schematic diagram of an interface to which an image display method is applied according to an embodiment of this application.

Example 5: The image display method in this embodiment of this application may be applied to a scene in which if a photo is already displayed on the first display surface of the first three-dimensional model control, the user is not satisfied with the photo on the first display surface, and needs to update the photo on the first display surface. With reference to the foregoing example 1, as shown in FIG. 7A, when the user wants to re-photograph an image to replace the image on the first display surface 31, the user may directly tap the shutter control (that is, the foregoing third input) in a case that the first display surface 31 faces the user. In this case, after receiving the tap input, as shown in FIG. 7B, the electronic device enables the camera to photograph a new image 71 (that is, the foregoing second image), and uses the image 71 to replace the image on the first display surface.

In this way, when the electronic device is not satisfied with the first image already displayed on the first display surface, the electronic device may be controlled to re-photograph an image when the electronic device displays the first display surface, so that the photographed second image can directly replace the first image that is not satisfied by the user without a need for the user to perform a replacement step (for example, deleting the first image on the first display surface). In this way, the user can conveniently and quickly photograph an image that is satisfied by the user by using the electronic device.

In an embodiment of this application, after the first image photographed by the camera is displayed on the first display surface in the N display surfaces in step 201, the image display method provided in this embodiment of this application further includes the following step F1 and step F2:

Step F1: The image display apparatus receives a fifth input performed by a user.

Step F2: The image display apparatus displays, according to a target initial three-dimensional expansion model in response to the fifth input, images displayed on all display surfaces of the first three-dimensional model control.

For example, the target initial three-dimensional expansion model is a plane model formed after the image display apparatus performs three-dimensional expansion on the first three-dimensional model control.

For example, the target initial three-dimensional expansion model includes N display regions, and an image on one display surface of the first three-dimensional model control is correspondingly displayed in one display region.

For example, the image display apparatus may display, on the target program interface, the images displayed on all the display surfaces of the first three-dimensional model control.

For example, the target program interface may be an album display interface or an image editing interface in the electronic device.

In an example, images displayed on the image editing interface may be all images photographed by the electronic device. In the image editing interface, it may be directly located at a location of the target initial three-dimensional expansion model, and images in display regions of the target initial three-dimensional expansion model are displayed.

Further, when the target program interface is the image editing interface, the image editing interface may display only images in the target initial three-dimensional expansion model, and hide other images in the album.

For example, for the fifth input, refer to the foregoing descriptions of the first input. Details are not described herein again.

For example, the fifth input may be used to trigger the electronic device to display, on the target program interface by using the target initial three-dimensional expansion model, the images displayed on the display surfaces of the first three-dimensional model control.

In an example, the fifth input may be an input that triggers the electronic device to enter the image editing interface from the photographing preview interface.

For example, the target initial three-dimensional expansion model may be a plane model obtained after the three-dimensional model corresponding to the first three-dimensional model control is expanded.

For example, the target initial three-dimensional expansion model includes N display regions, and one display region corresponds to one display surface of the three-dimensional model corresponding to the first three-dimensional model control.

For example, the image display apparatus may display, on the target program interface by using a thumbnail, all the images displayed on the display surfaces of the first three-dimensional control.

Figure 8:
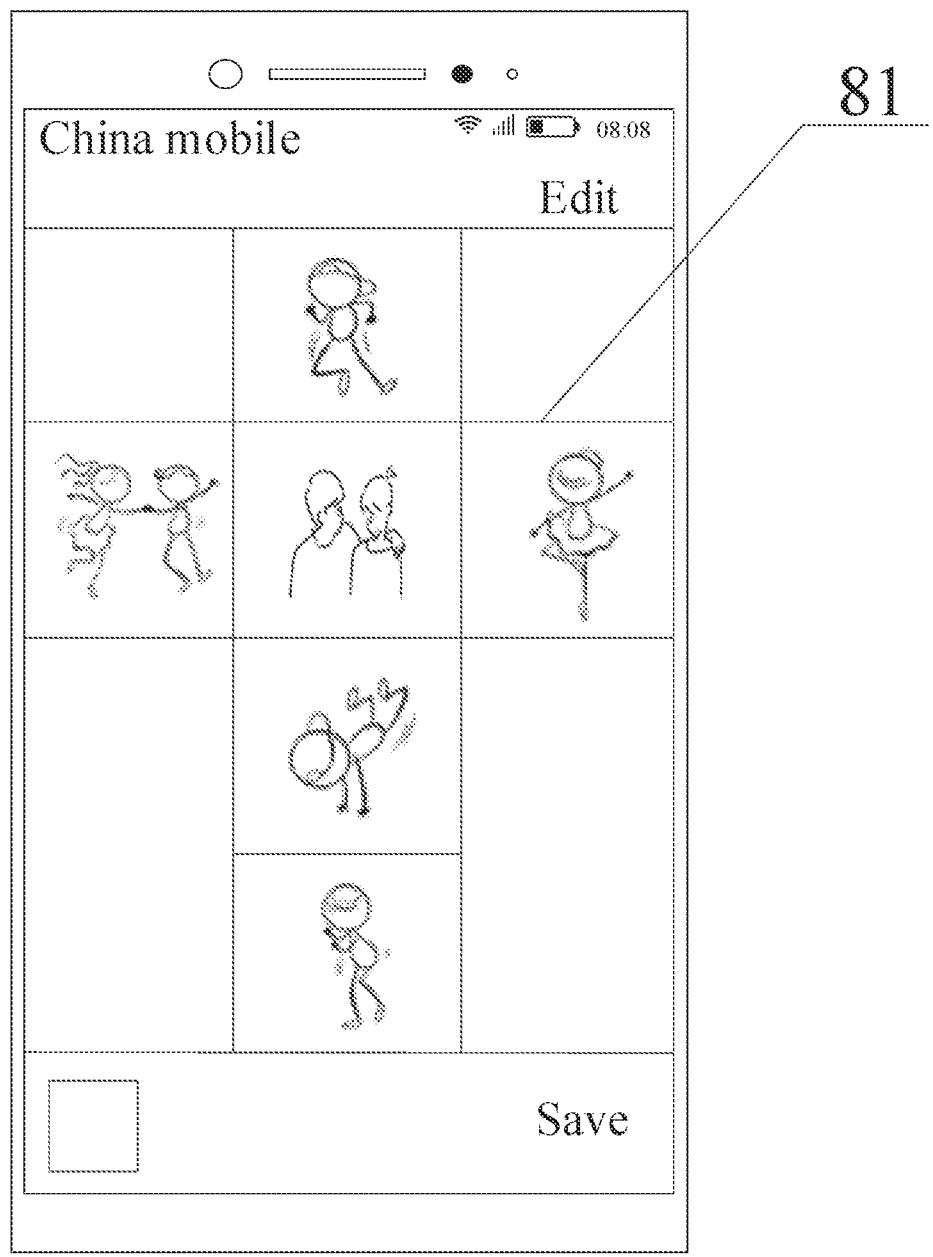
FIG. 8 is a thirteenth schematic diagram of an interface to which an image display method is applied according to an embodiment of this application.

For example, the three-dimensional model corresponding to the first three-dimensional model control is a hexahedron model. As shown in FIG. 8, a hexahedron model corresponding to the hexahedron model control 22 is a hexahedron plane model 81 (that is, the target initial three-dimensional expansion model) after being expanded, the plane model includes six display regions, each display region corresponds to each display surface of the first three-dimensional model control, and an image on each display surface of the first three-dimensional model control is correspondingly displayed on each display region of the hexahedron plane model 81.

In this way, the electronic device may display the target three-dimensional expansion model corresponding to the first three-dimensional model control, and display an image displayed on the first three-dimensional model control, so that the user can view the image displayed on the first three-dimensional model control and perform a subsequent image editing operation.

In an embodiment of this application, when the target initial three-dimensional expansion model is displayed on the target program interface, a region sign may be added to a region of the target initial three-dimensional expansion model.

For example, in step F2 of displaying, according to a target initial three-dimensional expansion model, images displayed on all display surfaces of the first three-dimensional model control, the image display method provided in this embodiment of this application further includes the following step G1:

Step G1: The image display apparatus displays, on a target program interface according to the target initial three-dimensional expansion model, the images displayed on all the display surfaces of the first three-dimensional model control.

For example, the target program interface further includes Y third images, and all the display surfaces of the first three-dimensional model control do not include the third image.

After step F1, the image display method provided in this embodiment of this application further includes the following step G2:

Step G2: The image display apparatus displays N region signs on the target program interface.

For example, the target program interface may be a display interface for displaying the images displayed on all the display surfaces of the first three-dimensional model control in the electronic device, for example, an album interface.

For example, one region sign is used to indicate a region range of one display region of the target initial three-dimensional expansion model, and Y is a positive integer.

For example, the region sign may be an image sign, for example, a thick-line frame sign, or may be a color sign, for example, a highlight sign of different colors with transparency in a display region, or may be a dynamic sign, for example, a thick-line frame dynamic flashing sign.

For example, region signs corresponding to different target initial three-dimensional expansion models are different.

Figure 9A:
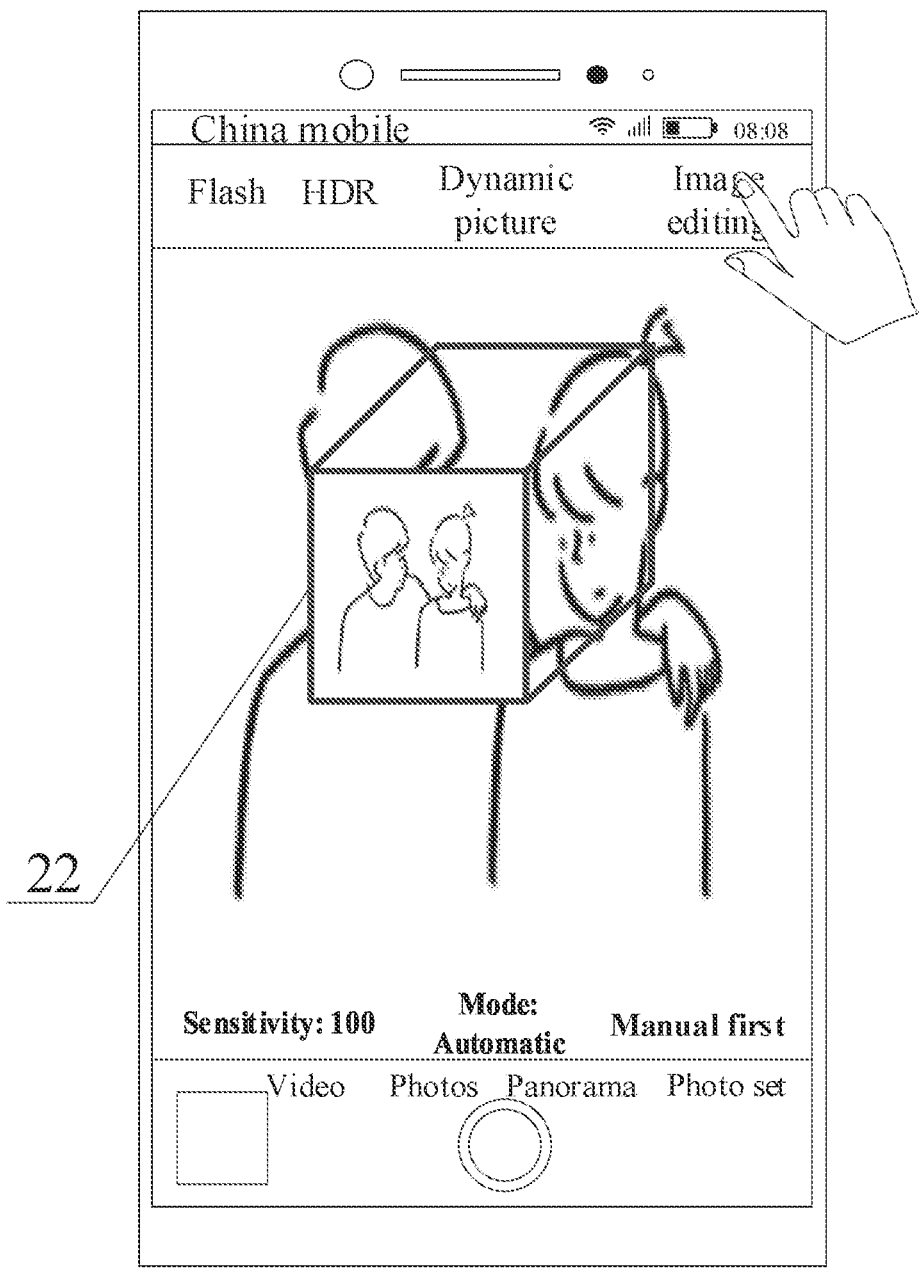
FIG. 9A is a fourteenth schematic diagram of an interface to which an image display method is applied according to an embodiment of this application.
Figure 9B:
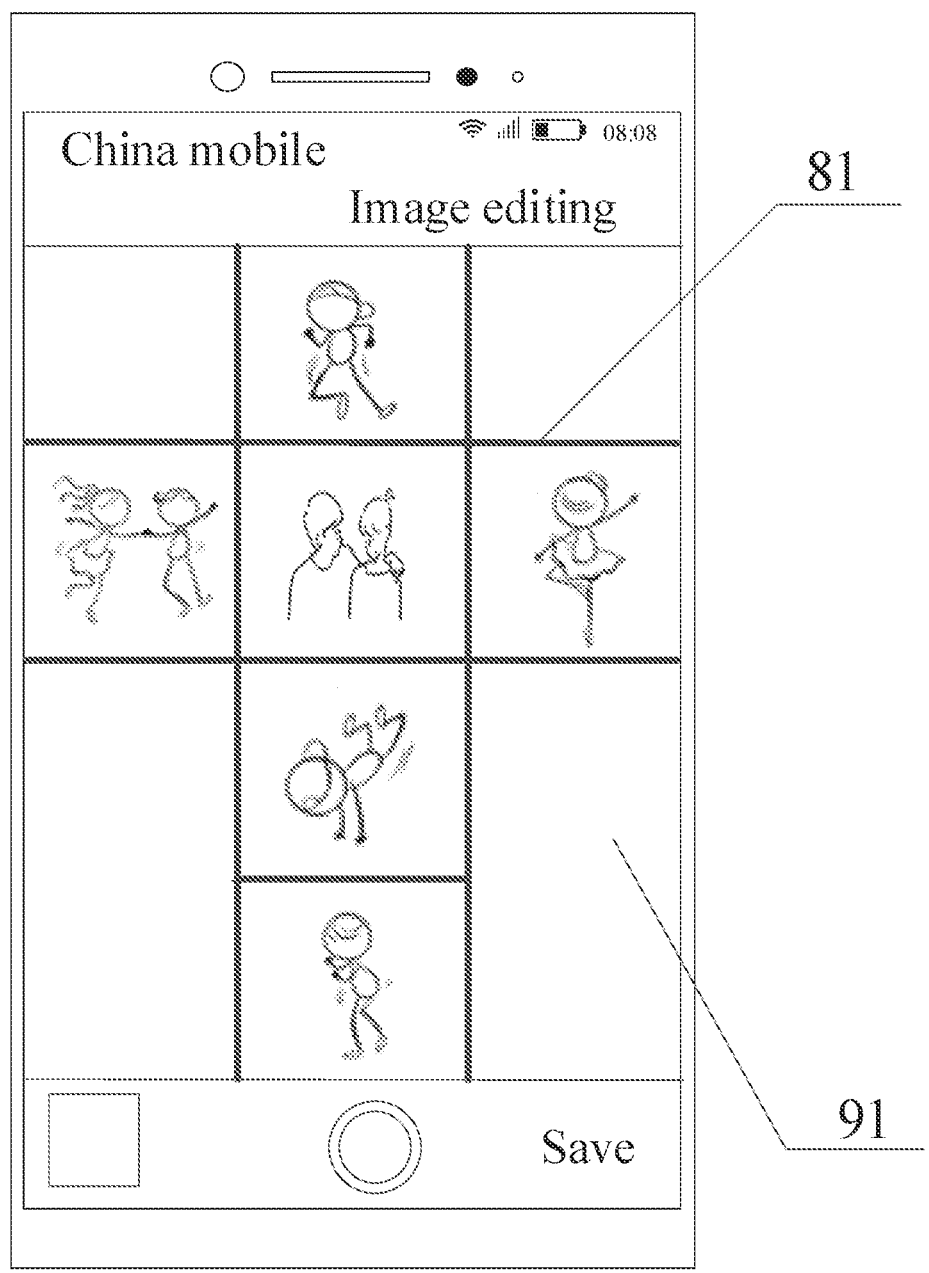
FIG. 9B is a fifteenth schematic diagram of an interface to which an image display method is applied according to an embodiment of this application.

Example 6: The image display method in this embodiment of this application may be applied to a scene in which after entering an album interface, the user needs to search N images on a first three-dimensional control model among all photos in the album interface. With reference to the foregoing example 1, as shown in FIG. 9A, after completing photographing, the user taps an image editing control (that is, the foregoing fifth input) in the photographing preview interface. As shown in FIG. 9B, the user enters an image editing interface 91 (that is, the foregoing target program interface). A hexahedron model corresponding to the hexahedron model control 22 displayed on the image editing interface 91 is a hexahedron plane model 81 after being expanded. A thumbnail of six surfaces on the hexahedron model control 22 is displayed on six display regions of the hexahedron plane model 81, and six bold-frame signs (that is, the foregoing region signs) are displayed on the six display regions of the hexahedron plane model 81, so that the user can view a location of the hexahedron plane model 81.

In this way, a region sign is displayed on the target program interface, so that the user can more conveniently and clearly view a display location of the target initial three-dimensional expansion model on the target program interface.

In an embodiment of this application, on this basis, after step G1, the image display method provided in this embodiment of this application further includes the following step H1 and step H2:

Step H1: The image display apparatus receives a sixth input performed by a user on a target third image and a fourth image.

Step H2: The image display apparatus exchanges a display location of the target third image and a display location of the fourth image in response to the sixth input.

For example, the target third image is one of the Y third images, and the fourth image is an image displayed in the first three-dimensional model control.

For example, for the sixth input, refer to the foregoing descriptions of the first input. Details are not described herein again.

For example, the sixth input may be used to trigger the electronic device to exchange the display location of the target third image and the display location of the fourth image.

In an example, the sixth input may be a slide input in a relative direction simultaneously performed by the user on the target third image and the fourth image.

It should be noted that, a prerequisite for the slide input is that the user may directly view the target third image and the fourth image on a same display interface.

For example, when the user is not satisfied with the fourth image displayed on the display surface of the first three-dimensional model control, and wants to replace the fourth image, the user may select, from the Y third images on the target program interface, the target third image that meets a requirement of the user, and simultaneously perform the sixth input on the target third image and the fourth image. After receiving the sixth input, the electronic device exchanges the display location of the target third image and the display location of the fourth image.

Figure 10A:
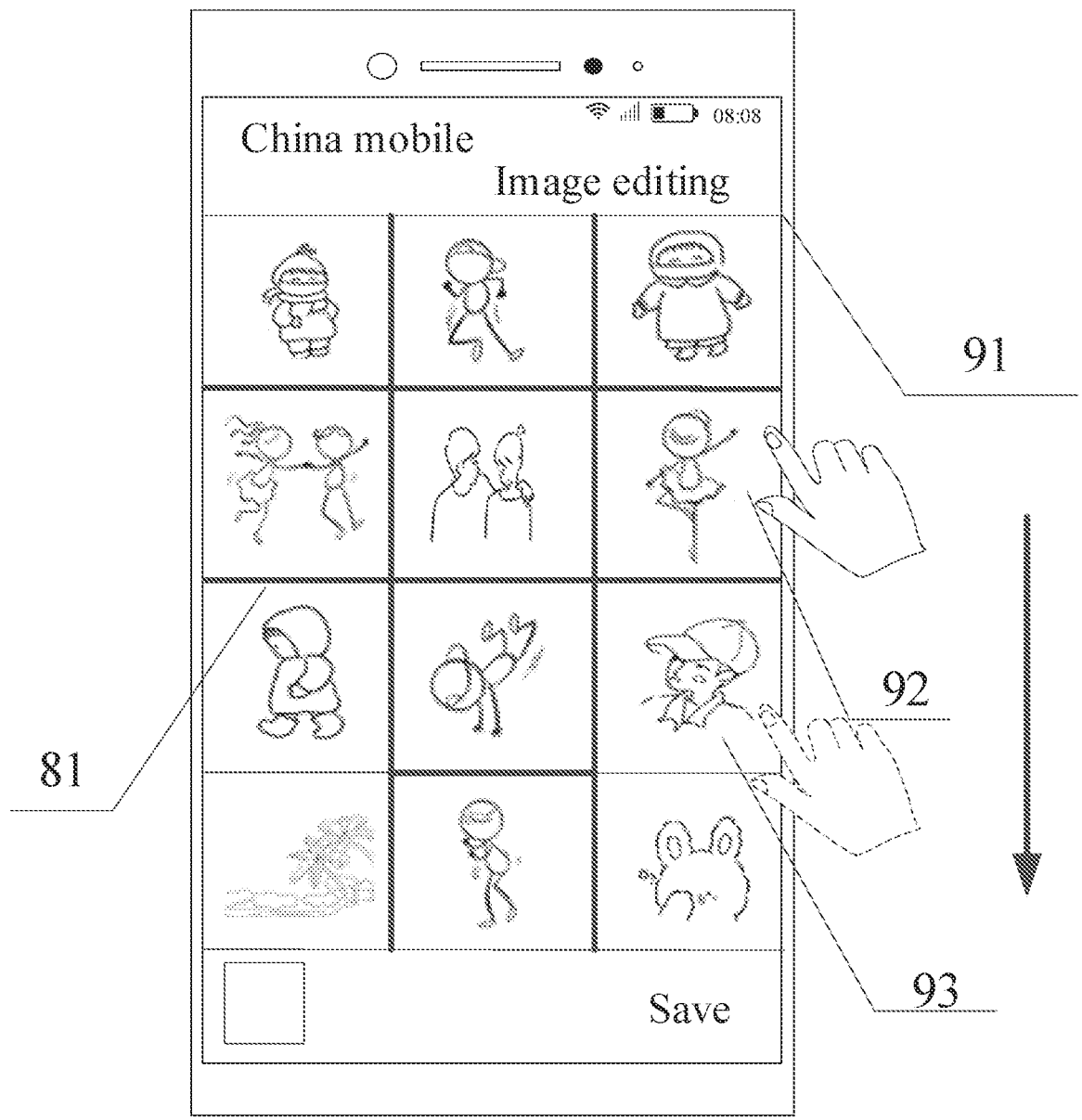
FIG. 10A is a sixteenth schematic diagram of an interface to which an image display method is applied according to an embodiment of this application.
Figure 10B:
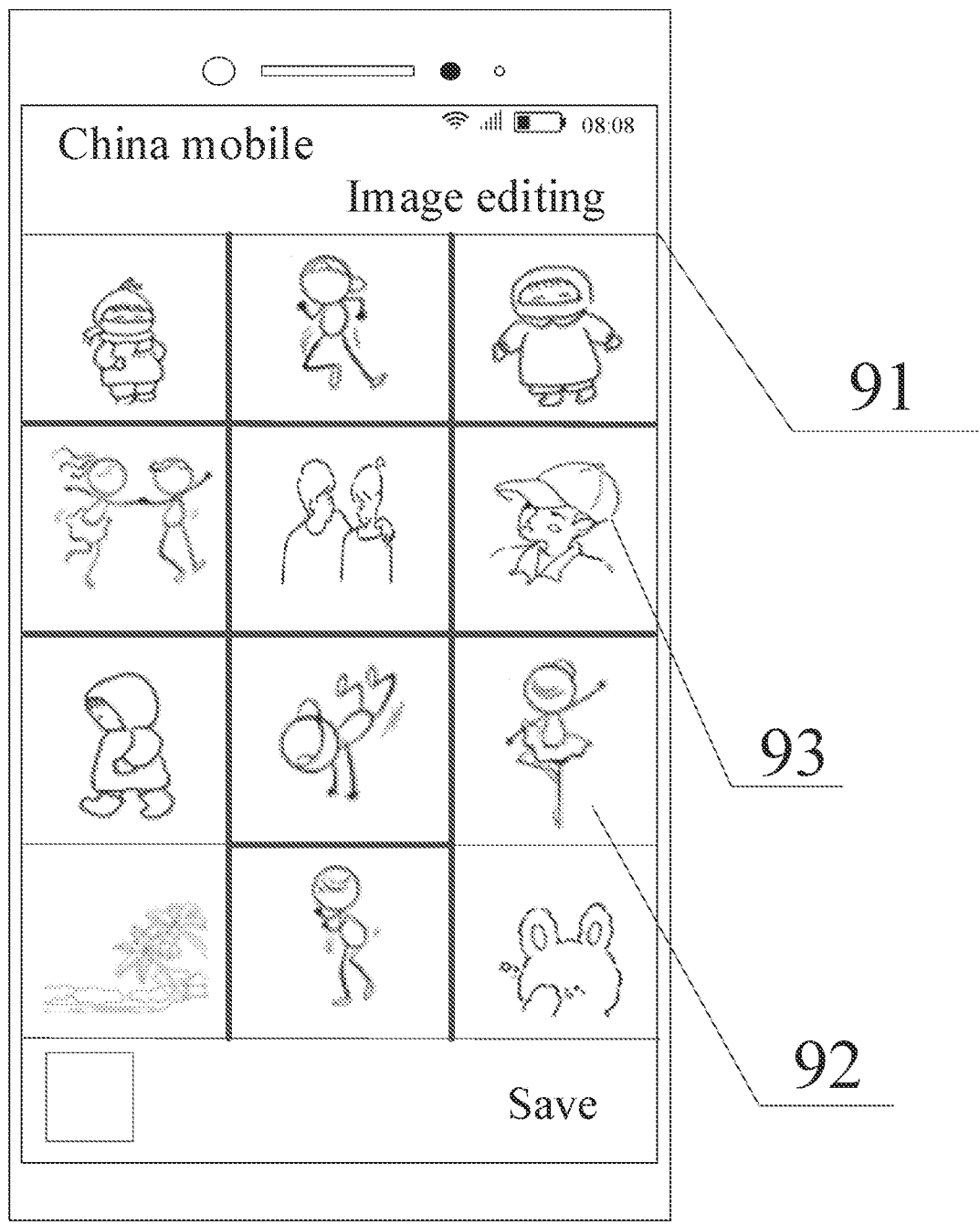
FIG. 10B is a seventeenth schematic diagram of an interface to which an image display method is applied according to an embodiment of this application.

Example 7: The image display method in this embodiment of this application may be applied to a scene in which after the user views N photos on a first three-dimensional control model in an album interface, another photo in the album interface needs to be used to replace one photo on the first three-dimensional model control. With reference to the foregoing example 6, as shown in FIG. 10A, when the user wants to exchange display locations of an image 92 (the fourth image) and an image 93 (the target third image) on a display region 91 in a hexahedron plane model 81, a slide input in a relative direction (that is, the foregoing sixth input) may be performed on the image 92 (the fourth image) and the image 93 (the target third image). In this case, as shown in FIG. 10B, the electronic device exchanges the display locations of the image 92 and the image 93.

In this way, when the user is not satisfied with an image displayed on a display surface of the first three-dimensional model control, after a satisfied image is found, the sixth input may be performed on the dissatisfied image and the satisfied image for the user, so that display location of different images can be conveniently replaced, and the user can subsequently view an image that is satisfied by the user by using the first three-dimensional model control.

In an embodiment of this application, in a case that the first three-dimensional model control includes Z images, the image display method provided in this embodiment of this application further includes the following step I1 to step I4:

Step I1: The image display apparatus generates an image sign from a target image on the first three-dimensional model control.

Step I2: The image display apparatus associates and stores the first three-dimensional model control, the image sign, and the Z images into a target storage space.

Step I3: The image display apparatus receives a seventh input performed by a user.

Step I4: The image display apparatus displays a target program interface in response to the seventh input.

For example, the target program interface includes the image sign, the image sign is used to indicate the target image, the target image is any image on the first three-dimensional model control, an image sign of an image in the Z images except the target image is in a hidden state, and Z is a positive integer.

For example, for the target program interface, refer to content in the foregoing descriptions. Details are not described herein again.

For example, a display form of the image sign may be a picture form. In an example, the sign in the foregoing picture form may be a sign obtained after the target image is scaled down by the electronic device in equal proportion.

For example, the target storage space is a space used to store an image in the electronic device.

For example, the image display apparatus may associate and store the first three-dimensional model control, the image sign, and the Z images. Further, when the first three-dimensional model control is no longer displayed on the display interface of the electronic device, and the user needs to invoke the first three-dimensional model control from the electronic device for viewing, the image sign may be input to invoke the first three-dimensional model control and the Z images on the first three-dimensional model control.

For example, for the seventh input, refer to the foregoing descriptions of the first input. Details are not described herein again.

For example, the seventh input may be used to trigger the image display apparatus to display the target program interface including the image sign.

In this way, after the user completes photographing, the first three-dimensional model control and an image on the control may be stored in the electronic device, any image on the control is used as a target image to generate an image sign, and when the user views an image on the first three-dimensional model control on the target program interface, the first three-dimensional model control and the image on the control may be displayed as only one image sign, and an image except the target image is hidden, thereby saving a display space of the first three-dimensional model control and the image on the target program interface.

In an embodiment of this application, after step 202, the image display method provided in this embodiment of this application further includes the following step J1 and step J2:

Step J1: The image display apparatus receives an eighth input performed by a user on the target image in a case that the target image is displayed on the target program interface.

Step J2: The image display apparatus displays a target initial three-dimensional expansion model on the target program interface in response to the eighth input.

For example, the target image is an image displayed on a display surface of the first three-dimensional model control.

For example, the target image may be used to indicate the target initial three-dimensional expansion model.

For example, the target initial three-dimensional expansion model includes N display regions, and an image on one display surface corresponding to the first three-dimensional model control is displayed in one display region.

For example, the target program interface may be a display interface used to save an image, for example, a display interface of an album application.

For example, for the eighth input, refer to the foregoing descriptions of the first input. Details are not described herein again.

For example, the eighth input may be used to trigger the electronic device to display the target initial three-dimensional expansion model on the target program interface.

In an example, the target initial three-dimensional expansion model may be suspended on the target program interface.

For example, to save and collect the N images displayed on the N display surfaces of the first three-dimensional model control, the electronic device may generally display only an image of a specific display surface on the N display surfaces of the first three-dimensional model control on the target program interface. After receiving the seventh input performed by a user, the electronic device displays the target initial three-dimensional expansion model on the target program interface.

Further, in the target program interface, an information sign may be marked on an image on the foregoing specific display surface. For the information sign, refer to the foregoing descriptions of the region sign. Details are not described herein again.

Figure 11A:
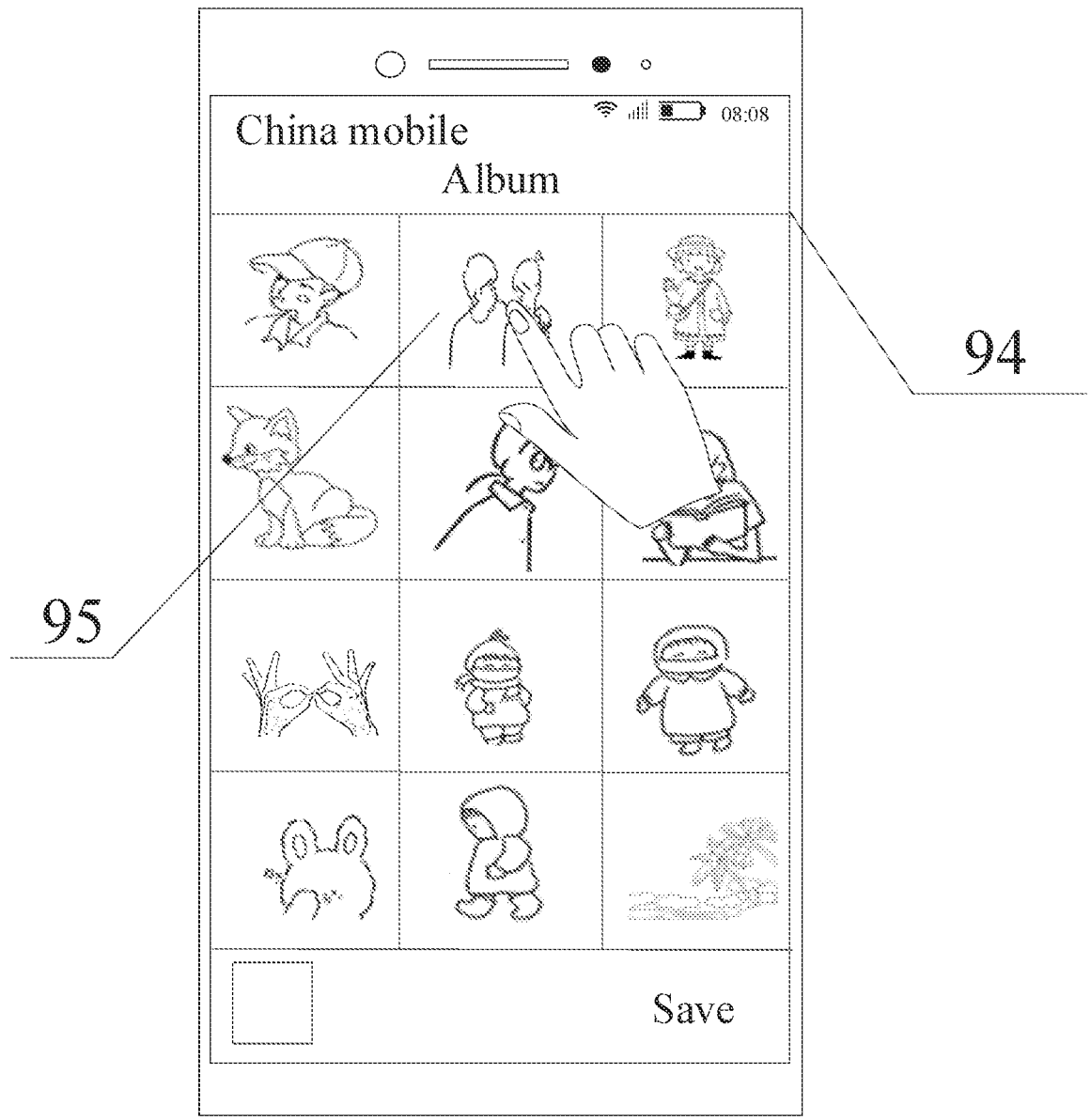
FIG. 11A is an eighteenth schematic diagram of an interface to which an image display method is applied according to an embodiment of this application.
Figure 11B:
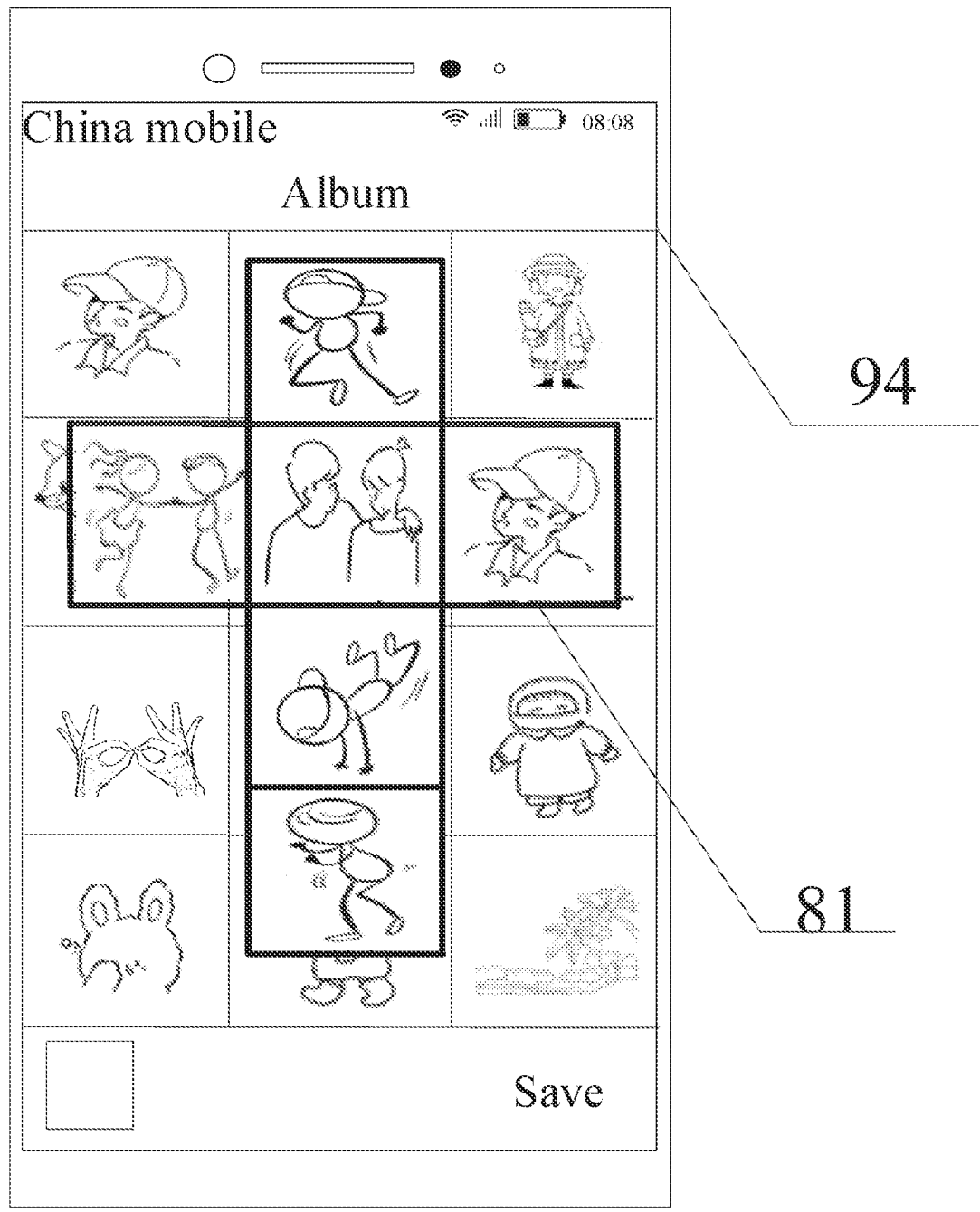
FIG. 11B is a nineteenth schematic diagram of an interface to which an image display method is applied according to an embodiment of this application.

Example 8: The image display method in this embodiment of this application may be applied to a scene in which the user needs to view a plurality of photos on an expansion plane model corresponding to the first three-dimensional model control in the album interface. With reference to the foregoing example 1, if the user saves six photos corresponding to the hexahedron three-dimensional control 22 in the album application, as shown in FIG. 11A, when the electronic device enters an album interface 94 (that is, the foregoing target program interface), an image 95 (that is, the foregoing target image) is tapped in the album interface. As shown in FIG. 11B, the hexahedron plane model 81 (that is, the foregoing target initial three-dimensional expansion model) corresponding to the image 95 is suspended on the album interface 94.

In this way, the electronic device may display only one image in the target initial three-dimensional expansion model on the target program interface, to indicate the target initial three-dimensional expansion model, thereby saving a display space of the target program interface, and facilitating the electronic device to save the image in the target initial three-dimensional expansion model on the target program interface.

In an embodiment of this application, in a case that the three-dimensional model corresponding to the target three-dimensional model control is a multi-layer cascading model, the first input is a continuous photographing input. On this basis, the foregoing step 202 of the image display method provided in this embodiment of this application may include the following step K:

Step K: The image display apparatus displays the M images obtained by means of continuous photographing layer by layer on M layers of display surfaces corresponding to the multi-layer cascading model, where each layer of display surface displays one image.

For example, the first image includes the M images, and the first display surface includes the M layers of display surfaces.

For example, the continuous photographing input is an input for continuously photographing a plurality of images by using a photographing application. In an example, the continuous photographing input may be a long-press input performed by the user on the photographing control.

For example, the multi-layer cascading model may be used to display a plurality of images continuously photographed by the user.

For example, the electronic device may prestore a plurality of multi-layer cascading models according to a cascading quantity. For example, the electronic device may prestore a three-layer cascading model, a six-layer cascading model, and a nine-layer cascading model.

In this way, when the user needs to use a photographing application to perform continuous photographing, a multi-layer cascading model corresponding to a continuous photographing mode may be used, so that the user can view and use an image obtained by means of continuous photographing.

In an embodiment of this application, in a case that the three-dimensional model corresponding to the target three-dimensional model control is a three-dimensional circular model, in the received first input performed by the user in step 201, the image display method provided in this embodiment of this application may include the following step L1:

Step L1: The image display apparatus receives a slide input performed by a user.

For example, an input track of the slide input matches a shape of the three-dimensional circular model.

Based on step L1, in the foregoing step 202, the image display method provided in this embodiment of this application may include the following step L2:

Step L2: The image display apparatus displays, on the first display surface of the N display surfaces, a panoramic image photographed by the camera.

For example, the first display surface is a spherical surface corresponding to the three-dimensional circular model.

For example, the first image is a panoramic image.

In this way, when the user needs to use a photographing application to perform a panoramic photographing mode, a three-dimensional circular model corresponding to the panoramic photographing mode may be used, so that the user can view and use an image obtained by means of continuous photographing.

It should be noted that the image display method provided in the embodiments of this application may be performed by an image display apparatus, or a control module that is in the image display apparatus and that is configured to perform the image display method. In the embodiments of this application, that the image display apparatus performs the image display method is used as an example to describe the image display apparatus provided in the embodiments of this application.

Figure 12:
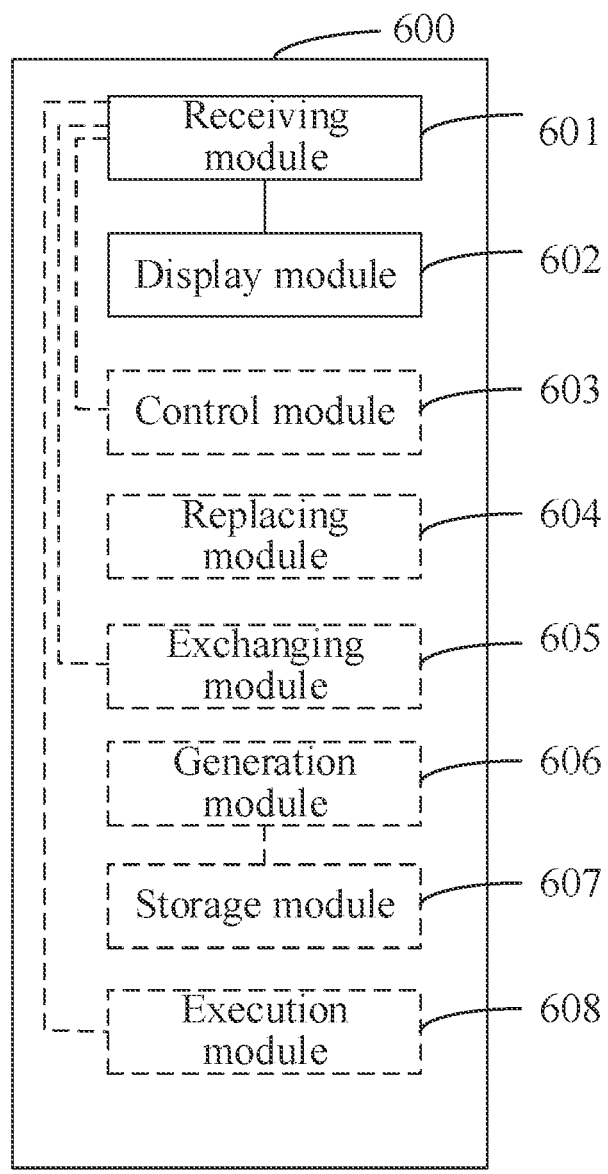
FIG. 12 is a schematic structural diagram of an image display apparatus according to an embodiment of this application.

FIG. 12 is a possible schematic structural diagram of an image display apparatus according to an embodiment of this application. As shown in FIG. 12, an image display apparatus 600 includes a receiving module 601 and a display module 602. The receiving module 601 is configured to receive a first input performed by a user in a case that a first three-dimensional model control is displayed on a photographing preview interface, where the first three-dimensional model control includes N display surfaces, and N is a positive integer. The display module 602 is configured to display, on a first display surface in the N display surfaces in response to the first input received by the receiving module 601, a first image photographed by a camera, where each display surface in the N display surfaces is used to display one image, and different display surfaces are used to display different images.

According to the image display apparatus provided in this embodiment of this application, in a case that a first three-dimensional model control including N display surfaces is displayed on a photographing preview interface, the image display apparatus may display, on a first display surface of the first three-dimensional model control after receiving a first input, a first image photographed by a camera, where each display surface in the N display surfaces is used to display one image, and different display surfaces are used to display different images. In this way, a plurality of images can be directly viewed by viewing different display surfaces of the first three-dimensional model control on the photographing preview interface without a need to re-enter an album to search for an image, thereby reducing an interaction time and meeting a requirement of a user to customize a display effect of a photo set in more scenes.

In an embodiment of this application, the receiving module 601 is further configured to receive a second input performed by a user. The display module 602 is further configured to: in response to the second input of the receiving module 601, update the first three-dimensional model control to a second three-dimensional model control; and display, on M display surfaces of the second three-dimensional model control, M images displayed on M display surfaces of the first three-dimensional model control, where the second three-dimensional model control includes X display surfaces, each display surface in the X display surfaces is used to display one image, different display surfaces are used to display different images, X and M are positive integers, and X and N are greater than or equal to M.

In this way, the user can flexibly adjust, according to a requirement of the user, a three-dimensional model corresponding to a three-dimensional model control in an electronic device, so that a quantity of images displayed on the three-dimensional model control can be adjusted, thereby adjusting an image display effect, and facilitating the user to compare images displayed on the three-dimensional model control.

In an embodiment of this application, the receiving module 601 is further configured to receive a third input performed by a user. The display module 602 is further configured to display, on a target display surface in the N display surfaces in response to the third input received by the receiving module, a second image photographed by the camera.

In this way, the image display apparatus may display a plurality of different images in a photo set by using different display surfaces of the first three-dimensional model control, that is, more images may be displayed by using one three-dimensional model control. Therefore, the user does not need to specifically search for different photos in the photo set, thereby facilitating the user to view a photo, and further performing another operation on the photo in the photo set.

In an embodiment of this application, the apparatus 600 further includes a control module 603. The third input includes a slide input, a sliding start location of the slide input is located on the first display surface of the first three-dimensional model control, and a sliding end location of the slide input is located on a second display surface of the first three-dimensional model control; and the second display surface is different from the first display surface. The control module 603 is specifically configured to: in response to the third input received by the receiving module 601, control the first three-dimensional model control to rotate, where the second display surface is a focus display surface of the rotated first three-dimensional model control, and the focus display surface is a display surface with a largest visible area. The receiving module 601 is specifically configured to receive a fourth input performed by the user. The display module 602 is specifically configured to display, on the target display surface in the N display surfaces in response to the fourth input received by the receiving module 601, the second image photographed by the camera, where the target display surface includes the first display surface or the second display surface.

In this way, through the fourth input on the electronic device, the user may control the electronic device to re-photograph an image on the first display surface or the second display surface of the first three-dimensional model control, thereby reducing steps of an operation of re-photographing an image on each display surface of the first three-dimensional model control by the user.

In an embodiment of this application, the fourth input includes a press input. The display module 602 is specifically configured to: in a case that press duration of the press input is greater than or equal to preset duration, display, on the first display surface, the second image photographed by the camera. The display module 602 is specifically configured to: in a case that the press duration of the press input is less than the preset duration, display, on the second display surface, the second image photographed by the camera.

In this way, after the user completes viewing images displayed on the first display surface and the second display surface, if the user is not satisfied with an image displayed on the first display surface and wants to replace this image, by rotating the first three-dimensional model control and performing a press input of preset duration on the second display surface, the user may control the image display apparatus to directly replace the first image on the first display surface with the second image with a need to rotate to the first display surface again, thereby reducing steps of the operation and improving efficiency of photographing an image by using the electronic device, or by rotating the first three-dimensional model control and performing an input operation on a photographing control, the user may control the electronic device to directly display the second image on the second display surface, thereby facilitating the user to subsequently compare different image.

In an embodiment of this application, the apparatus 600 further includes a replacing module 604. The receiving module 601 is specifically configured to receive the third input performed by the user in a case that a focus display surface of the first three-dimensional model control is the first display surface. The replacing module 604 is specifically configured to replace the first image displayed on the first display surface with the second image photographed by the camera, where the target display surface is the first display surface.

In this way, when the user is not satisfied with the first image already displayed on the first display surface, the image display apparatus may be controlled to re-photograph an image when the image display apparatus displays the first display surface, so that the photographed second image can directly replace the first image that is not satisfied by the user without a need for the user to perform a replacement step (for example, deleting the first image on the first display surface). In this way, the user can conveniently and quickly photograph an image that is satisfied by the user by using the electronic device.

In an embodiment of this application, the receiving module 601 is configured to receive a fifth input performed by a user. The display module 602 is configured to display, according to a target initial three-dimensional expansion model in response to the fifth input received by the receiving module 601, images displayed on all display surfaces of the first three-dimensional model control, where the target initial three-dimensional expansion model is a plane model formed after three-dimensional expansion is performed on the first three-dimensional model control, the target initial three-dimensional expansion model includes N display regions, and an image displayed in each display region is in a one-to-one correspondence with an image on each display surface of the first three-dimensional model control.

In this way, the image display apparatus may display the target three-dimensional expansion model corresponding to the first three-dimensional model control, and display an image displayed on the first three-dimensional model control, so that the user can view the image displayed on the first three-dimensional model control and perform a subsequent image editing operation.

In an embodiment of this application, the display module 602 is specifically configured to display, on a target program interface according to the target initial three-dimensional expansion model, the images displayed on all the display surfaces of the first three-dimensional model control, where the target program interface further includes Y third images, and all the display surfaces of the first three-dimensional model control do not include the third image. The display module 602 is further configured to display N region signs on the target program interface, where one region sign is used to indicate a region range of one display region of the target initial three-dimensional expansion model, and Y is a positive integer.

In this way, a region sign is displayed on the target program interface, so that the user can more conveniently and clearly view a display location of the target initial three-dimensional expansion model on the target program interface.

In an embodiment of this application, the apparatus 600 further includes an exchanging module 605. The receiving module 601 is further configured to receive a sixth input performed by a user on a target third image and a fourth image, where the target third image is one of the M third images, the fourth image is an image displayed in the first three-dimensional model control, and M is a positive integer. The exchanging module 605 is configured to exchange a display location of the target third image and a display location of the fourth image in response to the sixth input received by the receiving module 601.

In this way, when the user is not satisfied with an image displayed on a display surface of the first three-dimensional model control, after a satisfied image is found, the sixth input may be performed on the dissatisfied image and the satisfied image for the user, so that display location of different images can be conveniently replaced, and the user can subsequently view an image that is satisfied by the user by using the first three-dimensional model control.

In an embodiment of this application, the apparatus 600 further includes a generation module 606 and a storage module 607. In a case that the first three-dimensional model control includes Z images, the generation module 606 is configured to generate an image sign from a target image on the first three-dimensional model control. The storage module 607 is configured to associate and store the first three-dimensional model control, the image sign generated by the generation module 606, and the Z images into a target storage space. The receiving module 601 is further configured to receive a seventh input performed by a user. The display module 602 is further configured to display a target program interface in response to the seventh input received by the receiving module 601, where the target program interface includes the image sign, the image sign is used to indicate the target image, the target image is any image on the first three-dimensional model control, an image sign of an image in the Z images except the target image is in a hidden state, and Z is a positive integer.

In this way, after the user completes photographing, the first three-dimensional model control and an image on the control may be stored in the electronic device, any image on the control is used as a target image to generate an image sign, and when the user views an image on the first three-dimensional model control on the target program interface, the first three-dimensional model control and the image on the control may be displayed as only one image sign, and an image except the target image is hidden, thereby saving a display space of the first three-dimensional model control and the image on the target program interface.

In an embodiment of this application, the apparatus 600 further includes an execution module 608. The receiving module 601 is further configured to receive an eighth input performed by a user on the target image in a case that the target image is displayed on the target program interface, where the target image is an image displayed on one display surface of the first three-dimensional model control. The execution module 608 is further configured to display a target initial three-dimensional expansion model or the first three-dimensional model control on the target program interface in response to the eighth input received by the receiving module 601, where the target initial three-dimensional expansion model includes N display regions, and an image on one display surface of the first three-dimensional model control is correspondingly displayed in one display region.

In this way, the image display apparatus may display only one image in the target initial three-dimensional expansion model on the target program interface, to indicate the target initial three-dimensional expansion model, thereby saving a display space of the target program interface, and facilitating the electronic device to save the image in the target initial three-dimensional expansion model on the target program interface.

In an embodiment of this application, a three-dimensional model corresponding to the first three-dimensional model control may include any one of the following: a three-dimensional polyhedron model, a three-dimensional circular model, or a multi-layer cascading model.

In this way, the image display apparatus may display images in a plurality of manners by using a plurality of different models, thereby increasing a quantity of images that can be photographed by the user by using the electronic device, and enriching a manner of viewing the images and further editing the images.

In an embodiment of this application, in a case that the three-dimensional model corresponding to the first three-dimensional model control is a three-dimensional circular model, the receiving module 601 is specifically configured to receive a slide input performed by a user, where an input track of the slide input matches a shape of the three-dimensional circular model. The display module 602 is configured to display, on the first display surface in the N display surfaces, a panoramic image photographed by the camera, where the first display surface is a spherical surface corresponding to the three-dimensional circular model.

In this way, when the user needs to use a photographing application to perform a panoramic photographing mode, a three-dimensional circular model corresponding to the panoramic photographing mode may be used, so that the user can view and use an image obtained by means of continuous photographing.

The image display apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an Ultra-Mobile Personal Computer (UMPC), a netbook, or a Personal Digital Assistant (PDA). The non-mobile electronic device may be a server, a Network Attached Storage (NAS), a personal computer, a television, an automated teller machine, or a self-service machine. This is not specifically limited in the embodiments of this application.

The image display apparatus in this embodiment of this application may be an apparatus with an operating system. The operating system may be an Android operating system, an iOS operating system, or another possible operating system. This is not specifically limited in this embodiment of this application.

The image display apparatus provided in this embodiment of this application can implement the processes implemented in the method embodiments in FIG. 1 to FIG. 11. To avoid repetition, details are not described herein again.

Figure 13:
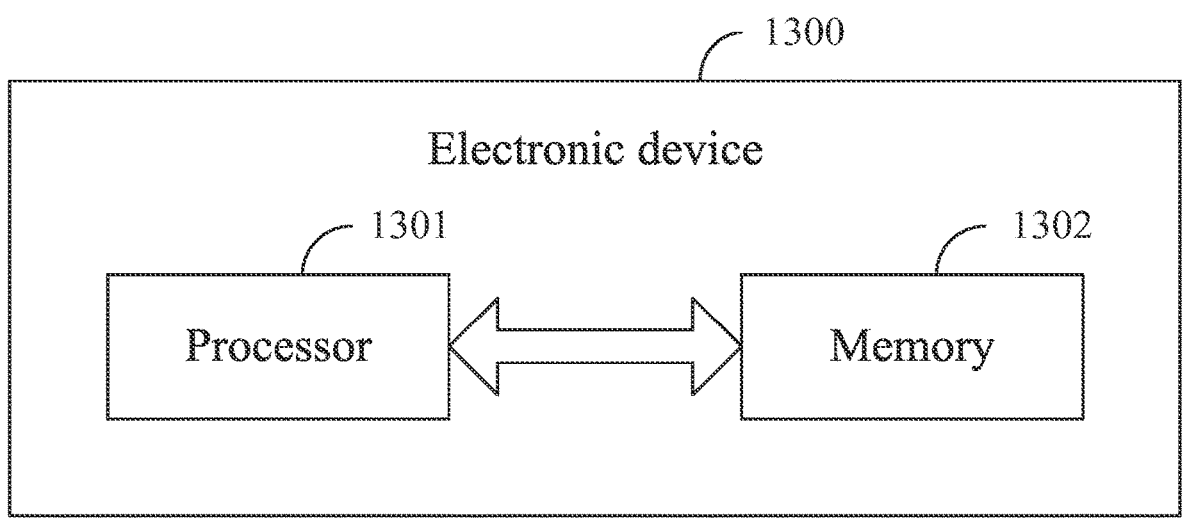
FIG. 13 is a first schematic structural diagram of an electronic device according to an embodiment of this application.

In an embodiment of this application, as shown in FIG. 13, an embodiment of this application further provides an electronic device 1300, including a processor 1301, a memory 1302, and a program or an instruction that is stored in the memory 1302 and that can be run on the processor 1301. When the program or the instruction is executed by the processor 1301, the processes of the foregoing image display method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

Figure 14:
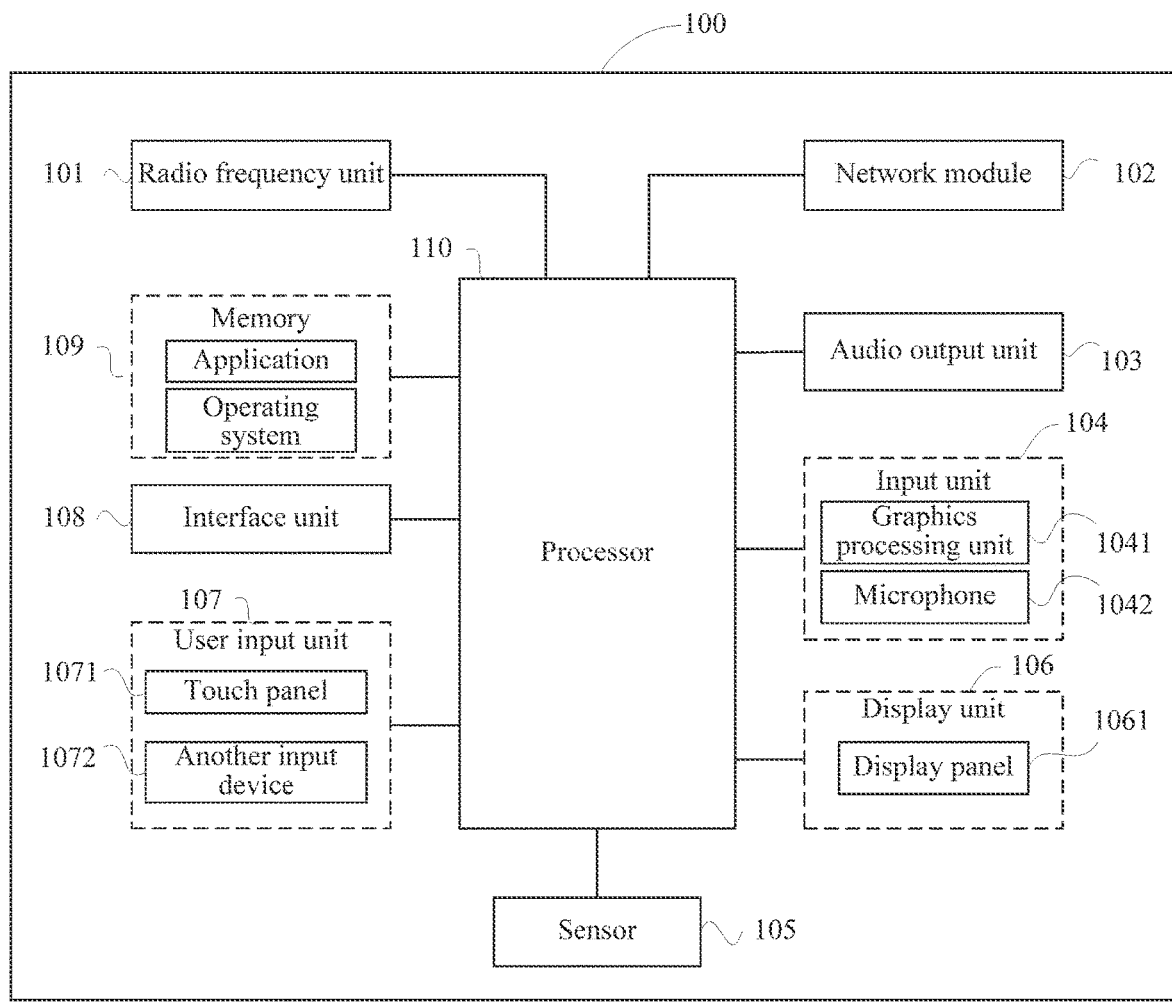
FIG. 14 is a second schematic structural diagram of an electronic device according to an embodiment of this application.

FIG. 14 is a schematic structural diagram of hardware of an electronic device according to an embodiment of this application.

An electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110. The user input unit 107 includes a touch panel 1071 and another input device 1072. The display unit 106 includes a display panel 1061, the input unit 104 includes an image processor 1041 and a microphone 1042, and the memory 109 may be configured to store a software program (for example, an operating system and an application required by at least one function) and various types of data.

A person skilled in the art can understand that the electronic device 100 may further include a power supply (such as a battery) that supplies power to each component. The power supply may be logically connected to the processor 110 by using a power supply management system, to implement functions such as charging and discharging management, and power consumption management by using the power supply management system. The structure of the electronic device shown in FIG. 14 does not constitute a limitation on the electronic device. The electronic device may include components more or fewer than those shown in the diagram, a combination of some components, or different component arrangements. Details are not described herein.

The user input unit 107 is configured to receive a first input performed by a user in a case that a first three-dimensional model control is displayed on a photographing preview interface, where the first three-dimensional model control includes N display surfaces, and N is a positive integer. The display unit 106 is configured to display, on a first display surface in the N display surfaces in response to the first input received by the user input unit 107, a first image photographed by a camera, where each display surface in the N display surfaces is used to display one image, and different display surfaces are used to display different images.

According to the electronic device provided in this embodiment of this application, in a case that a first three-dimensional model control including N display surfaces is displayed on a photographing preview interface, the electronic device may display, on a first display surface of the first three-dimensional model control after receiving a first input, a first image photographed by a camera, where each display surface in the N display surfaces is used to display one image, and different display surfaces are used to display different images. In this way, a plurality of images can be directly viewed by viewing different display surfaces of the first three-dimensional model control on the photographing preview interface without a need to re-enter an album to search for an image, thereby reducing an interaction time and meeting a requirement of a user to customize a display effect of a photo set in more scenes.

In an embodiment of this application, the user input unit 107 is further configured to receive a second input performed by a user. The display unit 106 is further configured to: in response to the second input received by the user input unit 107, exchange the first three-dimensional model control to a second three-dimensional model control, and display, on M display surfaces of the second three-dimensional model control, M images displayed on M display surfaces of the first three-dimensional model control, where the second three-dimensional model control includes X display surfaces, each display surface in the X display surfaces is used to display one image, different display surfaces are used to display different images, X and M are positive integers, and X and N are greater than or equal to M.

In this way, the user can flexibly adjust, according to a requirement of the user, a three-dimensional model corresponding to a three-dimensional model control in an image display apparatus, so that a quantity of images displayed on the three-dimensional model control can be adjusted, thereby adjusting an image display effect, and facilitating the user to compare images displayed on the three-dimensional model control.

In an embodiment of this application, the user input unit 107 is further configured to receive a third input performed by a user. The display unit 106 is further configured to display, on a target display surface in the N display surfaces in response to the third input received by the user input unit 107, a second image photographed by the camera.

In this way, the electronic device may display a plurality of different images in a photo set by using different display surfaces of the first three-dimensional model control, that is, more images may be displayed by using one three-dimensional model control. Therefore, the user does not need to specifically search for different photos in the photo set, thereby facilitating the user to view a photo, and further performing another operation on the photo in the photo set.

In an embodiment of this application, the third input includes a slide input, a sliding start location of the slide input is located on the first display surface of the first three-dimensional model control, and a sliding end location of the slide input is located on a second display surface of the first three-dimensional model control; and the second display surface is different from the first display surface. The processor 110 is specifically configured to: in response to the third input that is input by the user input unit 107, control the first three-dimensional model control to rotate, where the second display surface is a focus display surface of the rotated first three-dimensional model control, and the focus display surface is a display surface with a largest visible area. The user input unit 107 is specifically configured to receive a fourth input performed by the user. The display unit 106 displays, on the target display surface in the N display surfaces in response to the fourth input that is input by the user input unit 107, the second image photographed by the camera; where the target display surface includes the first display surface or the second display surface.

In this way, through the fourth input on the electronic device, the user may control the electronic device to re-photograph an image on the first display surface or the second display surface of the first three-dimensional model control, thereby reducing steps of an operation of re-photographing an image on each display surface of the first three-dimensional model control by the user.

In an embodiment of this application, the fourth input includes a press input. The display unit 106 is specifically configured to: in a case that press duration of the press input is greater than or equal to preset duration, display, on the first display surface, the second image photographed by the camera. The display unit 106 is specifically configured to: in a case that the press duration of the press input is less than the preset duration, display, on the second display surface, the second image photographed by the camera.

In this way, after the user completes viewing images displayed on the first display surface and the second display surface, if the user is not satisfied with an image displayed on the first display surface and wants to replace this image, by rotating the first three-dimensional model control and performing a press input of preset duration on the second display surface, the user may control the image display apparatus to directly replace the first image on the first display surface with the second image with a need to rotate to the first display surface again, thereby reducing steps of the operation and improving efficiency of photographing an image by using the electronic device, or by rotating the first three-dimensional model control and performing an input operation on a photographing control, the user may control the electronic device to directly display the second image on the second display surface, thereby facilitating the user to subsequently compare different image.

In an embodiment of this application, the user input unit 107 is configured to receive the third input performed by the user in a case that a focus display surface of the first three-dimensional model control is the first display surface. The processor 110 is specifically configured to replace the first image displayed on the first display surface with the second image photographed by the camera, where the target display surface is the first display surface.

In this way, when the user is not satisfied with the first image already displayed on the first display surface, the electronic device may be controlled to re-photograph an image when the electronic device displays the first display surface, so that the photographed second image can directly replace the first image that is not satisfied by the user without a need for the user to perform a replacement step (for example, deleting the first image on the first display surface). In this way, the user can conveniently and quickly photograph an image that is satisfied by the user by using the electronic device.

In an embodiment of this application, the user input unit 107 is further configured to receive a fifth input performed by a user. The display unit 106 is further configured to display, according to a target initial three-dimensional expansion model in response to the fifth input, images displayed on all display surfaces of the first three-dimensional model control, where the target initial three-dimensional expansion model is a plane model formed after three-dimensional expansion is performed on the first three-dimensional model control, the target initial three-dimensional expansion model includes N display regions, and an image displayed in each display region is in a one-to-one correspondence with an image on each display surface of the first three-dimensional model control.

In this way, the electronic device may display the target three-dimensional expansion model corresponding to the first three-dimensional model control, and display an image displayed on the first three-dimensional model control, so that the user can view the image displayed on the first three-dimensional model control and perform a subsequent image editing operation.

In an embodiment of this application, the display unit 106 is specifically configured to display, on a target program interface according to the target initial three-dimensional expansion model, the images displayed on all the display surfaces of the first three-dimensional model control, where the target program interface further includes Y third images, and all the display surfaces of the first three-dimensional model control do not include the third image. The display unit 106 is further configured to display N region signs on the target program interface, where one region sign is used to indicate a region range of one display region of the target initial three-dimensional expansion model, and Y is a positive integer.

In this way, a region sign is displayed on the target program interface, so that the user can more conveniently and clearly view a display location of the target initial three-dimensional expansion model on the target program interface.

In an embodiment of this application, the user input unit 107 is further configured to receive a sixth input performed by a user on a target third image and a fourth image, where the target third image is one of the M third images, and the fourth image is an image displayed in the first three-dimensional model control. The processor 110 is further configured to exchange a display location of the target third image and a display location of the fourth image in response to the sixth input received by the user input unit 107.

In this way, when the user is not satisfied with an image displayed on a display surface of the first three-dimensional model control, after a satisfied image is found, the sixth input may be performed on the dissatisfied image and the satisfied image for the user, so that display location of different images can be conveniently replaced, and the user can subsequently view an image that is satisfied by the user by using the first three-dimensional model control.

In an embodiment of this application, in a case that the first three-dimensional model control includes Z images, the processor 110 is configured to generate an image sign from a target image on the first three-dimensional model control. The memory 109 is configured to associate and store the first three-dimensional model control, the image sign, and the Z images into a target storage space. The user input unit 107 is further configured to receive a seventh input performed by a user. The display unit 106 is further configured to display a target program interface in response to the seventh input that is input by the user input unit 107, where the target program interface includes the image sign, the image sign is used to indicate the target image, the target image is any image on the first three-dimensional model control, an image sign of an image in the Z images except the target image is in a hidden state, and Z is a positive integer.

In this way, after the user completes photographing, the first three-dimensional model control and an image on the control may be stored in the electronic device, any image on the control is used as a target image to generate an image sign, and when the user views an image on the first three-dimensional model control on the target program interface, the first three-dimensional model control and the image on the control may be displayed as only one image sign, and an image except the target image is hidden, thereby saving a display space of the first three-dimensional model control and the image on the target program interface.

In an embodiment of this application, the user input unit 107 is further configured to receive an eighth input performed by a user on the target image in a case that the target image is displayed on the target program interface, where the target image is an image displayed on one display surface of the first three-dimensional model control. The display unit 106 is further configured to display a target initial three-dimensional expansion model or the first three-dimensional model control on the target program interface in response to the eighth input received by the user input unit 107, where the target initial three-dimensional expansion model includes N display regions, and an image on one display surface of the first three-dimensional model control is correspondingly displayed in one display region.

In this way, the electronic device may display only one image in the target initial three-dimensional expansion model on the target program interface, to indicate the target initial three-dimensional expansion model, thereby saving a display space of the target program interface, and facilitating the electronic device to save the image in the target initial three-dimensional expansion model on the target program interface.

In an embodiment of this application, in a case that the three-dimensional model corresponding to the first three-dimensional model control is a three-dimensional circular model, the user input unit 107 is configured to receive a slide input performed by a user, where an input track of the slide input matches a shape of the three-dimensional circular model. The display unit 106 is configured to display, on the first display surface in the N display surfaces, a panoramic image photographed by the camera, where the first display surface is a spherical surface corresponding to the three-dimensional circular model.

In this way, when the user needs to use a photographing application to perform a panoramic photographing mode, a three-dimensional circular model corresponding to the panoramic photographing mode may be used, so that the user can view and use an image obtained by means of continuous photographing.

It should be understood that, in this embodiment of this application, the input unit 104 may include a Graphics Processing Unit (GPU) 1041 and a microphone 1042, and the graphics processing unit 1041 processes image data of a still picture or a video obtained by an image capture apparatus (such as a camera) in a video capture mode or an image capture mode. The display unit 106 may include a display panel 1061. In an embodiment of this application, the display panel 1061 may be configured in a form such as a liquid crystal display or an organic light-emitting diode. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various data, including but not limited to an application and an operating system. An application processor and a modem processor may be integrated into the processor 110, the application processor mainly processes an operating system, a user interface, an application, and the like, and the modem processor mainly processes wireless communication. It can be understood that, alternatively, the modem processor may not be integrated into the processor 110.

An embodiment of this application further provides a readable storage medium. The readable storage medium stores a program or an instruction, and when the program or the instruction is executed by a processor, the processes of the foregoing image display method embodiment are implemented and a same technical effect can be achieved. To avoid repetition, details are not described herein again.

The processor is a processor in the electronic device in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing image display method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer software product. The software product is stored in a storage medium, and the software product is executed by at least one processor to implement the processes of the foregoing continuous photographing method embodiment, and a same technical effect can be achieved. To avoid repetition, details are not described herein again.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. An image display method, comprising:
   when a first three-dimensional model control is displayed on a photographing preview interface, receiving a first input performed by a user, wherein the first three-dimensional model control comprises N display surfaces, and N is a positive integer, wherein the first input triggers a photographing operation of a camera;
   displaying, on a first display surface in the N display surfaces in response to the first input, a first image photographed by the camera as a preview of the photographing operation,
   wherein each display surface in the N display surfaces is used to preview one image, and different display surfaces are used to preview different images;
   receiving a third input performed by the user, wherein the third input comprises a slide input, a sliding start location of the slide input is located on the first display surface of the first three-dimensional model control, a sliding end location of the slide input is located on a second display surface of the first three-dimensional model control, and the second display surface is different from the first display surface;
   in response to the third input, controlling the first three-dimensional model control to rotate, wherein the second display surface is a focus display surface of the rotated first three-dimensional model control, and the focus display surface is a display surface with a largest visible area;
   receiving a fourth input performed by the user; and
   in response to the fourth input, displaying, on a target display surface in the N display surfaces, a second image photographed by the camera, wherein the target display surface comprises the first display surface or the second display surface.

2. The method according to claim 1, wherein the first three-dimensional model control displays M images, and after the displaying a first image photographed by a camera, the method comprises:
   receiving a second input performed by a user; and
   in response to the second input, updating the first three-dimensional model control to a second three-dimensional model control, and displaying, on M display surfaces of the second three-dimensional model control, M images displayed on M display surfaces of the first three-dimensional model control,
   wherein the second three-dimensional model control comprises X display surfaces, each display surface in the X display surfaces is used to display one image, different display surfaces are used to display different images, X and M are positive integers, and X and N are greater than or equal to M.

3. The method according to claim 1, wherein the fourth input comprises a press input; and the displaying, on a target display surface in the N display surfaces, a second image photographed by the camera comprises:
   when press duration of the press input is greater than or equal to preset duration, displaying, on the first display surface, the second image photographed by the camera; and
   when the press duration of the press input is less than the preset duration, displaying, on the second display surface, the second image photographed by the camera.

4. The method according to claim 1, wherein N images are displayed on the N display surfaces of the first three-dimensional model control, wherein the receiving a third input performed by a user comprises:

receiving the third input performed by the user when a focus display surface of the first three-dimensional model control is the first display surface, and wherein the displaying, on a target display surface in the N display surfaces, a second image photographed by the camera comprises:

replacing the first image displayed on the first display surface with the second image photographed by the camera, wherein the target display surface is the first display surface.

5. The method according to claim 1, wherein after the displaying, on a first display surface in the N display surfaces, a first image photographed by the camera as a preview of the photographing operation, the method further comprises:

receiving a fifth input performed by a user; and displaying, according to a target initial three-dimensional expansion model in response to the fifth input, images displayed on all display surfaces of the first three-dimensional model control, wherein the target initial three-dimensional expansion model is a plane model formed after three-dimensional expansion is performed on the first three-dimensional model control, the target initial three-dimensional expansion model comprises N display regions, and an image displayed in each display region is in a one-to-one correspondence with an image on each display surface of the first three-dimensional model control.

6. The method according to claim 5, wherein the displaying, according to a target initial three-dimensional expansion model, images displayed on all display surfaces of the first three-dimensional model control comprises:

displaying, on a target program interface according to the target initial three-dimensional expansion model, the images displayed on all the display surfaces of the first three-dimensional model control, wherein the target program interface further comprises Y third images, and all the display surfaces of the first three-dimensional model control do not comprise the third image, and wherein after the receiving a fifth input performed by a user, the method further comprises:

displaying N region signs on the target program interface, wherein one region sign is used to indicate a region range of one display region of the target initial three-dimensional expansion model, and Y is a positive integer.

7. The method according to claim 6, wherein after the displaying, on a target program interface according to the target initial three-dimensional expansion model, the images displayed on all the display surfaces of the first three-dimensional model control, the method further comprises:

receiving a sixth input performed by a user on a target third image and a fourth image, wherein the target third image is one of the Y third images, and the fourth image is an image displayed in the first three-dimensional model control; and exchanging a display location of the target third image and a display location of the fourth image in response to the sixth input.

8. The method according to claim 1, wherein when the first three-dimensional model control comprises Z images, the method further comprises:

generating an image sign from a target image on the first three-dimensional model control;

associating and storing the first three-dimensional model control, the image sign, and the Z images into a target storage space;

receiving a seventh input performed by a user; and displaying a target program interface in response to the seventh input, wherein the target program interface comprises the image sign, the image sign is used to indicate the target image, the target image is any image on the first three-dimensional model control, an image sign of an image in the Z images except the target image is in a hidden state, and Z is a positive integer.

9. The method according to claim 8, wherein after the displaying, on a first display surface in the N display surfaces, a first image photographed by the camera as a preview of the photographing operation, the method further comprises:

receiving an eighth input performed by a user on the target image when the target image is displayed on the target program interface, wherein the target image is an image displayed on one display surface of the first three-dimensional model control; and displaying a target initial three-dimensional expansion model or the first three-dimensional model control on the target program interface in response to the eighth input, wherein the target initial three-dimensional expansion model comprises N display regions, and an image on one display surface of the first three-dimensional model control is correspondingly displayed in one display region.

10. The method according to claim 1, wherein a three-dimensional model corresponding to the first three-dimensional model control comprise any one of the following: a three-dimensional polyhedron model, a three-dimensional circular model, or a multi-layer cascading model.

11. The method according to claim 10, wherein when the three-dimensional model corresponding to the first three-dimensional model control is a three-dimensional circular model, the receiving a first input performed by a user comprises:

receiving a slide input performed by a user, wherein an input track of the slide input matches a shape of the three-dimensional circular model, and wherein the displaying, on a first display surface in the N display surfaces, a first image photographed by the camera as a preview of the photographing operation comprises:

displaying, on the first display surface in the N display surfaces, a panoramic image photographed by the camera, wherein the first display surface is a spherical surface corresponding to the three-dimensional circular model.

12. An electronic device, comprising a processor and a memory storing a program or an instruction that is capable of running on the processor, wherein the program or the instruction, when executed by the processor, causes the electronic device to perform following operations:

when a first three-dimensional model control is displayed on a photographing preview interface, receiving a first input performed by a user, wherein the first three-dimensional model control comprises N display surfaces, and N is a positive integer, wherein the first input triggers a photographing operation of a camera;

displaying, on a first display surface in the N display surfaces in response to the first input, a first image photographed by the camera as a preview of the photographing operation, wherein each display surface in the N display surfaces is used to preview one image, and different display surfaces are used to preview different images;

receiving a third input performed by the user, wherein the third input comprises a slide input, a sliding start location of the slide input is located on the first display surface of the first three-dimensional model control, a sliding end location of the slide input is located on a second display surface of the first three-dimensional model control, and the second display surface is different from the first display surface;

in response to the third input, controlling the first three-dimensional model control to rotate, wherein the second display surface is a focus display surface of the rotated first three-dimensional model control, and the focus display surface is a display surface with a largest visible area;

receiving a fourth input performed by the user; and in response to the fourth input, displaying, on a target display surface in the N display surfaces, a second image photographed by the camera, wherein the target display surface comprises the first display surface or the second display surface.

13. The electronic device according to claim 12, wherein the first three-dimensional model control displays M images, and after the displaying a first image photographed by the camera as a preview of the photographing operation, the program or the instruction, when executed by the processor, causes the electronic device to further perform following operations:

receiving a second input performed by a user; and in response to the second input, updating the first three-dimensional model control to a second three-dimensional model control, and displaying, on M display surfaces of the second three-dimensional model control, M images displayed on M display surfaces of the first three-dimensional model control, wherein the second three-dimensional model control comprises X display surfaces, each display surface in the X display surfaces is used to display one image, different display surfaces are used to display different images, X and M are positive integers, and X and N are greater than or equal to M.

14. The electronic device according to claim 12, wherein the fourth input comprises a press input; and the displaying, on a target display surface in the N display surfaces, a second image photographed by the camera comprises:

when press duration of the press input is greater than or equal to preset duration, displaying, on the first display surface, the second image photographed by the camera; and when the press duration of the press input is less than the preset duration, displaying, on the second display surface, the second image photographed by the camera.

15. The electronic device according to claim 12, wherein N images are displayed on the N display surfaces of the first three-dimensional model control, the receiving a third input performed by a user comprises:

receiving the third input performed by the user when a focus display surface of the first three-dimensional model control is the first display surface, and wherein the displaying, on a target display surface in the N display surfaces, a second image photographed by the camera comprises:

replacing the first image displayed on the first display surface with the second image photographed by the camera, wherein the target display surface is the first display surface.

16. The electronic device according to claim 12, wherein after the displaying, on a first display surface in the N display surfaces, a first image photographed by the camera as a preview of the photographing operation, the program or the instruction, when executed by the processor, causes the electronic device to further perform following operations:

receiving a fifth input performed by a user; and displaying, according to a target initial three-dimensional expansion model in response to the fifth input, images displayed on all display surfaces of the first three-dimensional model control, wherein the target initial three-dimensional expansion model is a plane model formed after three-dimensional expansion is performed on the first three-dimensional model control, the target initial three-dimensional expansion model comprises N display regions, and an image displayed in each display region is in a one-to-one correspondence with an image on each display surface of the first three-dimensional model control.

* * * * *